US011947728B2

(12) United States Patent
Lee et al.

(10) Patent No.: US 11,947,728 B2
(45) Date of Patent: Apr. 2, 2024

(54) ELECTRONIC DEVICE FOR EXECUTING FUNCTION BASED ON HAND GESTURE AND METHOD FOR OPERATING THEREOF

(71) Applicant: Samsung Electronics Co., Ltd., Suwon-si (KR)

(72) Inventors: Eunbin Lee, Suwon-si (KR); Eunyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/731,890

(22) Filed: Apr. 28, 2022

(65) Prior Publication Data
US 2022/0350414 A1 Nov. 3, 2022

Related U.S. Application Data

(63) Continuation of application No. PCT/KR2022/004980, filed on Apr. 6, 2022.

(30) Foreign Application Priority Data

Apr. 30, 2021 (KR) .......................... 10-2021-0056481

(51) Int. Cl.
*G06F 3/01* (2006.01)
*G06F 1/16* (2006.01)
*G06F 3/0482* (2013.01)

(52) U.S. Cl.
CPC .............. *G06F 3/017* (2013.01); *G06F 1/163* (2013.01); *G06F 3/013* (2013.01); *G06F 3/0482* (2013.01)

(58) Field of Classification Search
CPC ........ G06F 3/017; G06F 3/013; G06F 3/0482; G06F 1/163
See application file for complete search history.

(56) References Cited

U.S. PATENT DOCUMENTS 10,261,595 B1 * 4/2019 Kin ..................... G06F 3/04815
10,747,371 B1 8/2020 Kulbida
(Continued)

FOREIGN PATENT DOCUMENTS

JP 2021-012684 A 2/2021
KR 10-2013-0109817 A 10/2013
(Continued)

OTHER PUBLICATIONS

International Search Report and Written Opinion dated Jul. 4, 2022, issued in International Patent Application No. PCT/KR2022/004980.

*Primary Examiner* — Matthew A Eason
*Assistant Examiner* — Chayce R Bibbee
(74) *Attorney, Agent, or Firm* — Jefferson IP Law, LLP

(57) ABSTRACT

A wearable electronic device may include a display, a camera, and a processor, wherein the processor is configured to, based on execution of a first application, control the display to display at least one first object corresponding to at least one first function of the first application at a position corresponding to at least one finger of a user wearing the wearable electronic device, based on identifying that a prespecified finger is in contact with a specific finger among the at least one finger by using the camera while the first application is executed, execute a first specific function corresponding to the specific finger among the at least one first function, based on execution of a second application, control the display to display at least one second object corresponding to at least one second function of the second application at the position corresponding to the at least one finger, and based on identifying that the prespecified finger is in contact with the specific finger by using the camera while the second application is executed, execute a second (Continued)

specific function corresponding to the specific finger among the at least one second function.

19 Claims, 25 Drawing Sheets

(56) References Cited

U.S. PATENT DOCUMENTS

| | | |
|---|---|---|
| 2008/0048930 A1 | 2/2008 | Breed |
| 2013/0259384 A1 | 10/2013 | Kwon et al. |
| 2014/0089849 A1 | 3/2014 | Choi et al. |
| 2014/0168061 A1 | 6/2014 | Kim |
| 2014/0201666 A1 | 7/2014 | Bedikian et al. |
| 2015/0370321 A1 | 12/2015 | Lundberg |
| 2016/0357263 A1 | 12/2016 | Antoniac et al. |
| 2019/0107896 A1 | 4/2019 | Stafford et al. |
| 2019/0384406 A1 | 12/2019 | Smith et al. |
| 2020/0004403 A1 | 1/2020 | Holz et al. |
| 2020/0042095 A1* | 2/2020 | Ang .................. G06F 3/017 |
| 2020/0097119 A1 | 3/2020 | Pahud et al. |
| 2021/0096726 A1* | 4/2021 | Faulkner .............. G06F 1/1686 |

FOREIGN PATENT DOCUMENTS

| | | |
|---|---|---|
| KR | 10-2014-0039641 A | 4/2014 |
| KR | 10-2014-0079162 A | 6/2014 |
| KR | 10-1712350 B1 | 3/2017 |
| KR | 10-2017-0116554 A | 10/2017 |

* cited by examiner

< 610 >

< 620 >

< 630 >

< 640 >

< 650 >

ELECTRONIC DEVICE FOR EXECUTING FUNCTION BASED ON HAND GESTURE AND METHOD FOR OPERATING THEREOF

CROSS-REFERENCE TO RELATED APPLICATION(S)

This application is a continuation application, claiming priority under § 365(c), of an International application No. PCT/KR2022/004980, filed on Apr. 6, 2022, which is based on and claims the benefit of a Korean patent application number 10-2021-0056481, filed on Apr. 30, 2021, in the Korean Intellectual Property Office, the disclosure of which is incorporated by reference herein in its entirety.

FIELD

The disclosure relates to a method and an apparatus for executing various functions of an electronic device by using a user's hand gestures.

DESCRIPTION OF RELATED ART

In line with development of electronic/communication technologies, electronic devices may become compact/lightweight to such an extent that, even when worn on user bodies, the same can be used without considerable inconvenience. For example, there are commercially available wearable electronic devices such as a head mounting device (HMD), a smart watch (or band), a contact lens-type device, a ring-type device, a glove-type device, a shoe-type device, or a garment-type device. Wearable electronic devices, directly worn on human bodies, may improve portability and user accessibility.

A head mounting-type electronic device is used while being worn on the user's head or face, and may provide the user with augmented reality (AR). For example, a head mounting device for providing AR may be implemented in an eyeglass type so as to provide the user with information regarding objects in at least a partial space of the user's field of view as images or texts.

The above information is presented as background information only to assist with an understanding of the disclosure. No determination has been made, and no assertion is made, as to whether any of the above might be applicable as prior art with regard to the disclosure.

In a virtual reality or augmented reality environment, a motion for pressing a virtual button positioned in the empty space when using a wearable electronic device, or a user motion having depth may be difficult to be performed as desired depending on the peripheral situation, may make it difficult to clearly recognize the perception of distance to the virtual object, or may cause a possibility that, if an action is made for a long time by using an entire arm, physical pain may be inflicted.

Aspects of the disclosure are to address at least the above-mentioned problems and/or disadvantages and to provide at least the advantages described below. Accordingly, an aspect of the disclosure is to provide an electronic device for executing various functions based on a user's hand gesture (for example, finger shape).

Additional aspects will be set forth in part in the description which follows and, in part, will be apparent from the description, or may be learned by practice of the presented embodiments.

SUMMARY

According to various embodiments, a wearable electronic device may include a display, a camera, and a processor, wherein the processor is configured to, based on execution of a first application, control the display to display at least one first object corresponding to at least one first function of the first application at a position corresponding to at least one finger of a user wearing the wearable electronic device, based on identifying that a prespecified finger is in contact with a specific finger among the at least one finger by using the camera while the first application is executed, execute a first specific function corresponding to the specific finger among the at least one first function, based on execution of a second application, control the display to display at least one second object corresponding to at least one second function of the second application at the position corresponding to the at least one finger, and based on identifying that the prespecified finger is in contact with the specific finger by using the camera while the second application is executed, execute a second specific function corresponding to the specific finger among the at least one second function. Various other embodiments may be possible.

According to various embodiments, an operation method of a wearable electronic device may include, based on execution of a first application, controlling a display of the wearable electronic device to display at least one first object corresponding to at least one first function of the first application at a position corresponding to at least one finger of a user wearing the wearable electronic device, based on identifying that a prespecified finger is in contact with a specific finger among the at least one finger by using a camera of the wearable electronic device while the first application is executed, executing a first specific function corresponding to the specific finger among the at least one first function, based on execution of a second application, controlling the display to display at least one second object corresponding to at least one second function of the second application at the position corresponding to the at least one finger, and based on identifying that the prespecified finger is in contact with the specific finger by using the camera while the second application is executed, executing a second specific function corresponding to the specific finger among the at least one second function.

According to various embodiments, the user's hand gesture is used to control functions of an electronic device quickly and conveniently such that the electronic device can be used with minimal motions without being limited by peripheral situations.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
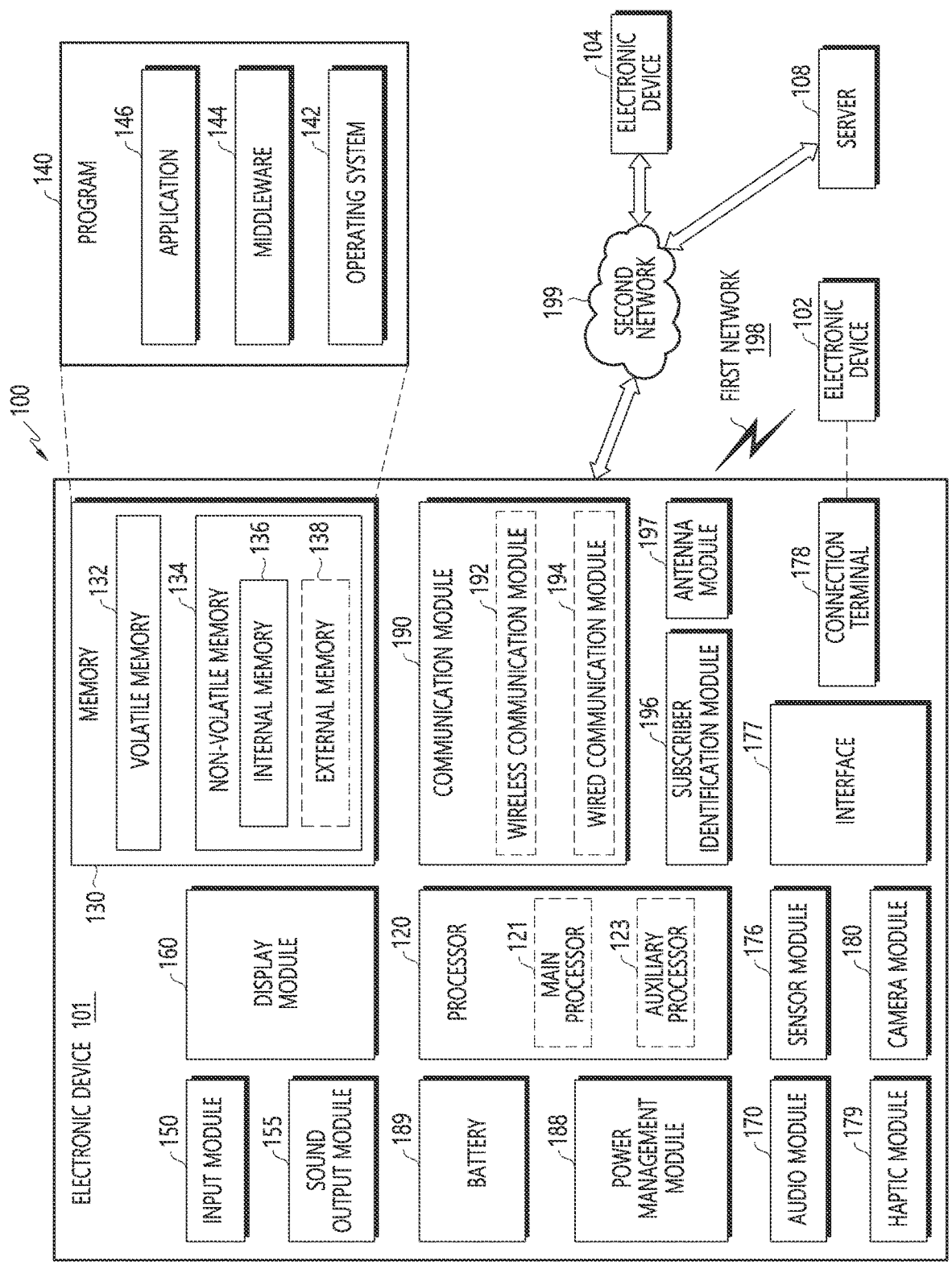
FIG. 1 is a block diagram of an electronic device in a network environment according to various embodiments.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
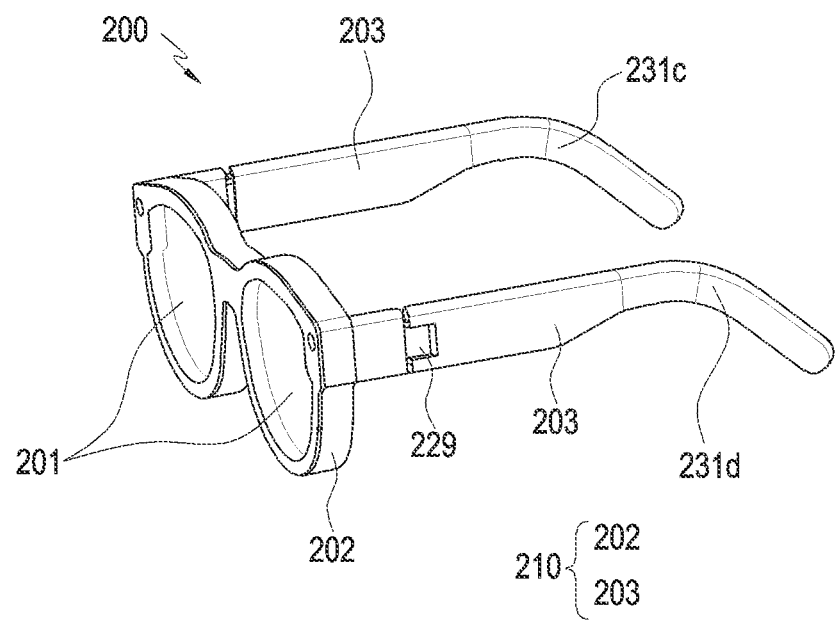
FIG. 2 is a perspective view of an electronic device according to various embodiments.

FIG. 2 is a perspective view illustrating an electronic device according to various embodiments.

Referring to FIG. 2, the electronic device 200 is a wearable electronic device in the form of glasses, and a user may visually recognize a surrounding object or environment in the state of wearing the electronic device 200. For example, the electronic device 200 may be a head mounting device (HMD) or smart glasses capable of providing an image directly in front of the user's eyes. The configuration of the electronic device 200 of FIG. 2 may be all or partly the same as that of the electronic device 101 of FIG. 1.

According to various embodiments, the electronic device 200 may include a housing 210 that defines an exterior of the electronic device 200. The housing 210 may provide a space in which components of the electronic device 200 may be disposed. For example, the housing 210 may include a lens frame 202 and at least one wearing member 203.

According to various embodiments, the electronic device 200 may include at least one display member 201 capable of providing visual information to the user. For example, the display member 201 may include a module equipped with a lens, a display, a waveguide, and/or a touch circuit. According to an embodiment, the display member 201 may be transparent or translucent. According to an embodiment, the display member 201 may include a translucent glass or a window member capable of adjusting the transmittance of light by adjusting the color concentration thereof. According to an embodiment, a pair of display members 201 may be provided and may be disposed to correspond to the left eye and the right eye of the user, respectively, in the state in which the electronic device 200 is worn on the user's body.

According to various embodiments, the lens frame 202 may accommodate at least a part of the display members 201. For example, the lens frame 202 may surround at least a part of the edges of the display members 201. According to an embodiment, the lens frame 202 may position at least one of the display members 201 to correspond to the user's eyes. According to an embodiment, the lens frame 202 may be a rim having a general eyeglass structure. According to an embodiment, the lens frame 202 may include at least one closed curve surrounding the display members 201.

According to various embodiments, the wearing member 203 may extend from the lens frame 202. For example, the wearing member 203 may extend from respective ends of the lens frame 202 and may be supported or located on the user's body (e.g., ears) together with the lens frame 202. According to an embodiment, the wearing member 203 may be rotatably coupled to the lens frame 202 through a hinge structure 229. According to an embodiment, the wearing member 203 may include inner surfaces 231c configured to face the user's body and outer surfaces 231d opposite to the inner surfaces.

According to various embodiments, the electronic device 200 may include a hinge structure 229 configured to enable the wearing member 203 to be folded with respect to the lens frame 202. The hinge structure 229 may be disposed between the lens frame 202 and the wearing member 203. In the state in which the electronic device 200 is not worn, the user may carry or store the electronic device 200 in the state in which the wearing member 203 is folded to partially overlap the lens frame 202.

Figure 3:
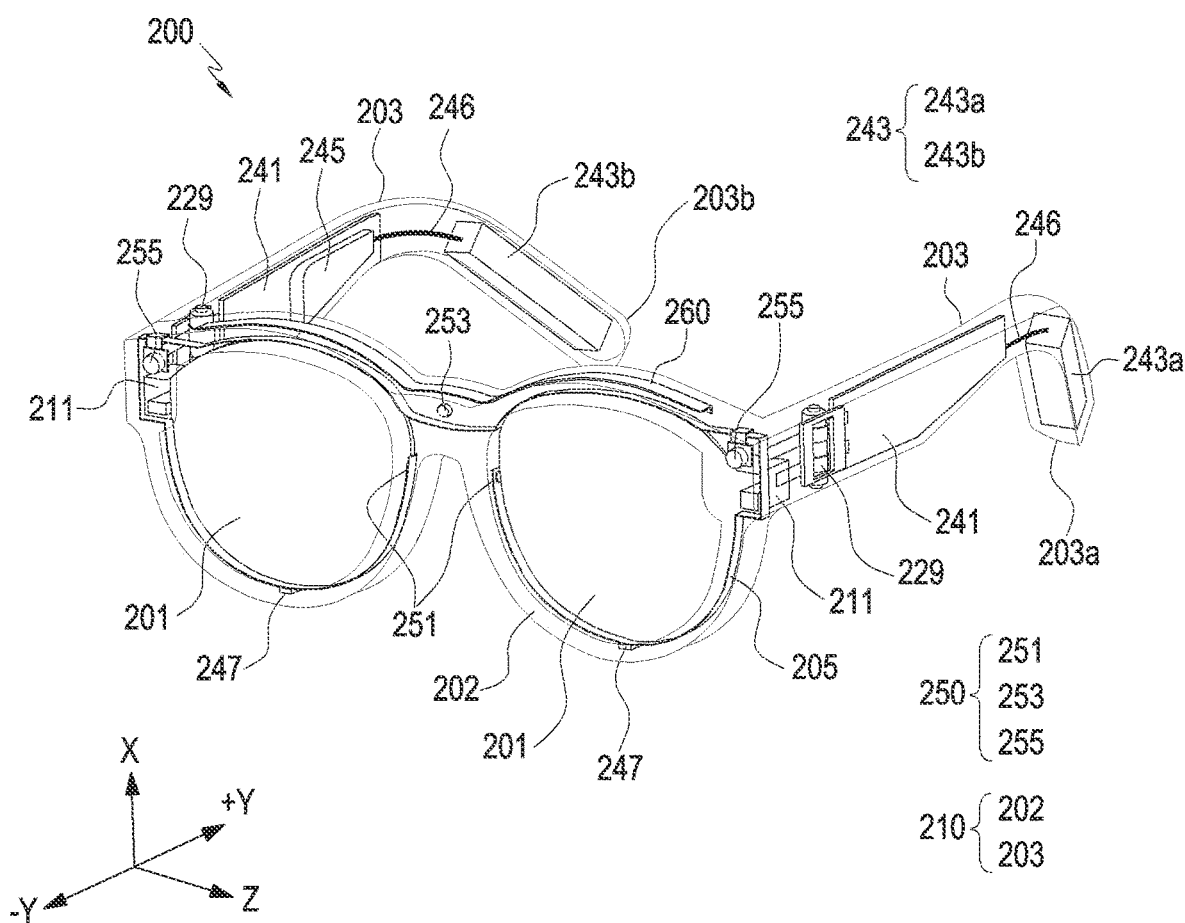
FIG. 3 is a first perspective view illustrating an internal configuration of an electronic device according to various embodiments.

FIG. 3 is a perspective view for describing an internal configuration of an electronic device according to various embodiments.

Figure 4:
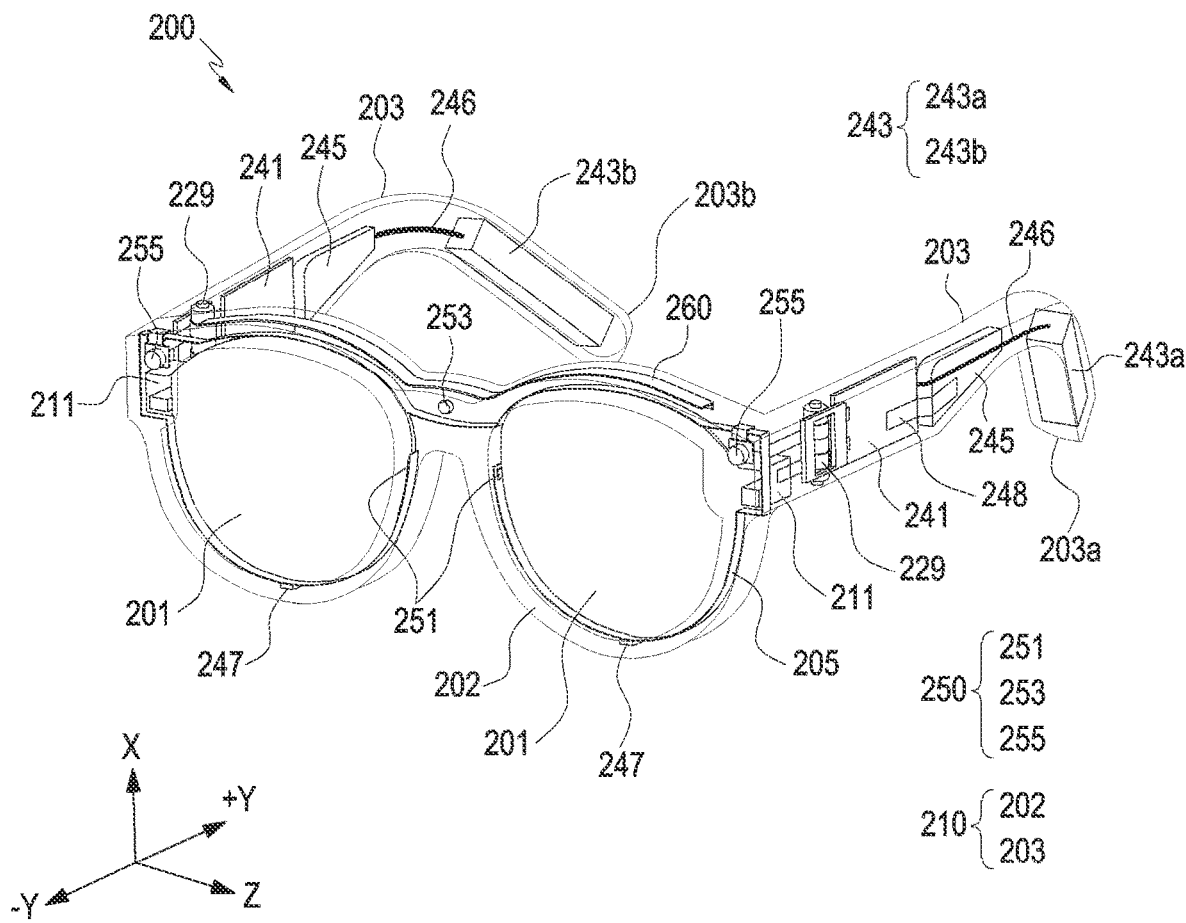
FIG. 4 is a second perspective view illustrating an internal configuration of an electronic device according to various embodiments.

FIG. 4 is a perspective view for describing an internal configuration of an electronic device according to various embodiments.

Figure 5:
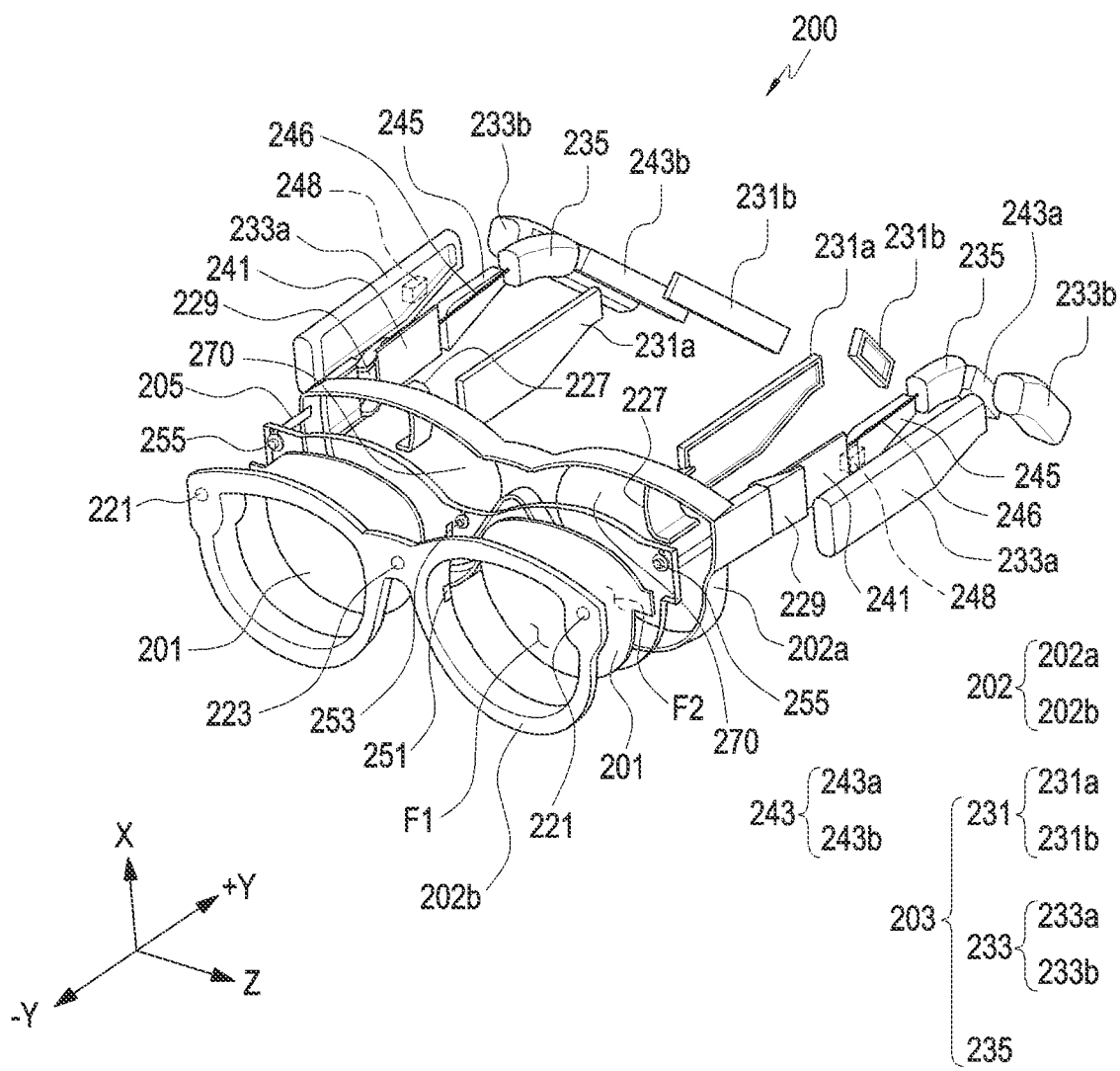
FIG. 5 is an exploded perspective view of an electronic device according to various embodiments.

FIG. 5 is an exploded perspective view illustrating an electronic device according to various embodiments.

Referring to FIGS. 3 to 5, the electronic device 200 may include components (e.g., at least one circuit board 241 (e.g., a printed circuit board (PCB), a printed board assembly (PBA)), a flexible PCB (FPCB), or a rigid-flex PCB (RFPCB)), at least one battery 243, at least one speaker module 245, at least one power transmission structure 246, and a camera module 250) accommodated in the housing 210. The configuration of the housing 210 of FIGS. 3 and 4 may be all or partly the same as the configuration of the display member 201, the lens frame 202, the wearing member 203, and the hinge structure 229 of FIG. 2.

According to various embodiments, the electronic device 200 may acquire and/or recognize visual images regarding an object or environment in a direction, in which the user gazes or the electronic device 200 is oriented (e.g., −Y direction), using a camera module 250 (e.g., the camera module 180 of FIG. 1) and may receive information about an object or environment from an external electronic device (e.g., the electronic devices 102 and 104 or the server 108 in FIG. 1) via a network (e.g., the first network 198 or the second network 199 in FIG. 1). In another embodiment, the electronic device 200 may provide the provided information about the object or environment to the user in an acoustic or visual form. The electronic device 200 may provide the received information about the object or environment to the user through the display member 201 in a visual form using a display module (e.g., the display module 160 in FIG. 1). For example, the electronic device 200 may implement augmented reality by implementing the information about an object or environment in a visual form and combining the information with an actual image of the environment around the user.

According to various embodiments, the display member 201 may include a first surface F1 oriented in a direction (e.g., in the −Y direction) in which external light is incident and a second surface F2 facing away from the first surface F1 (e.g., in the +Y direction). In the state in which the user wears the electronic device 200, at least a part of the light or image incident through the first surface F1 may pass through the second surface F2 of the display members 201, which is disposed to face the user's left eye and/or right eye to be incident to the user's left eye and/or right eye.

According to various embodiments, the lens frame 202 may include at least two frames. For example, the lens frame 202 may include a first frame 202a and a second frame 202b. According to an embodiment, when the user wears the electronic device 200, the first frame 202a may be a frame of a portion facing the user's face, and the second frame 202b may be a part of the lens frame 202 spaced apart from the first frame 202a in the user's gazing direction (e.g., −Y direction).

According to various embodiments, a light output module 211 may provide an image and/or a picture to the user. For example, the light output module 211 may include a display panel (not illustrated) capable of outputting an image, and a lens (not illustrated) corresponding to the user's eyes and is configured to guide the image to the corresponding display member 201. For example, the user may acquire an image output from the display panel of the light output module 211 through the lens of the light output module 211. According to various embodiments, each light output module 211 may include a device configured to display various pieces of information. For example, the light output module 211 may include at least one of a liquid crystal display (LCD), a digital mirror device (DMD), a liquid crystal-on-silicon (LCoS) device, or an organic light emitting diode, or an organic light-emitting diode (OLED), or a micro light emitting diode (a micro-LED). According to an embodiment, when the light output module 211 and/or the display member 201 include one of a liquid crystal display device, a digital mirror display device, or a silicon liquid crystal display device, the electronic device 200 may include a light source that emits light to a display area of the light output module 211 and/or the display member 201. According to another embodiment, when the light output module 211 and/or the display member 201 include one of an organic light emitting diode or a micro-LED, the electronic device 200 may provide a virtual image to the user without including a separate light source.

According to various embodiments, at least a part of the light output module 211 may be disposed in the housing 210. For example, the light output modules 211 may be disposed on the wearing member 203 or the lens frame 202 to correspond to the user's right eye and left eye, respectively. According to an embodiment, the light output module 211 may be connected to the display member 201 and may provide an image to the user through the display member 201. For example, an image output from the light output module 211 may be incident on the display member 201 via an input optical member located at one end of the display member 201, and may be emitted to the user's eyes through a waveguide and an output optical member located in at least a part of the display member 201. According to an embodiment, the waveguide may be made of glass, plastic, or polymer, and may include a nano-pattern formed on one inner or outer surface, for example, a grating structure of a polygonal or curved shape. According to an embodiment, the waveguide may include at least one of at least one diffractive element (e.g., a diffractive optical element (DOE) or a holographic optical element (HOE)) or a reflective element (e.g., a reflective mirror).

According to various embodiments, the circuit board 241 may include components for driving the electronic device 200. For example, the circuit board 241 may include at least one integrated circuit chip, and at least one of the processor 120, the memory 130, the power management module 188, or the communication module 190 of FIG. 1 may be provided in the integrated circuit chip. According to an embodiment, the circuit board 241 may be disposed inside each wearing member 203 of the housing 210. According to an embodiment, the circuit board 241 may be electrically connected to the battery 243 via a power transmission structure 246. According to an embodiment, the circuit board 241 may be connected to a flexible printed circuit board 205 and may transmit electric signals to electronic components (e.g., the light output modules 211, the camera module 250, and a light emitter (e.g., the light emitter illustrated in FIG. 5)) of the electronic device via the flexible printed circuit board 205. According to an embodiment, the circuit board 241 may be an interposer board.

According to various embodiments, the flexible printed circuit board 205 may extend from the circuit board 241 across a hinge structure 229 into the inside of the lens frame 202 and may be disposed in at least a part around the display member 201 in the inside of the lens frame 202.

According to various embodiments, the battery 243 (e.g., the battery 189 in FIG. 1) may be electrically connected to the components (e.g., the light output module 211, the circuit board 241, the speaker module 245, the microphone module 247, and/or the camera module 250) of the electronic device 200, and may supply power to the components of the electronic device 200.

According to various embodiments, at least a part of the battery 243 may be disposed on the wearing member 203. According to an embodiment, the battery 243 may be disposed adjacent to the end 203a or 203b of the wearing member 203. For example, the battery 243 may include a first battery 243a disposed at the first end 203a of the wearing member 203 and a second battery 243b disposed at the second end 203b of the wearing member 203.

According to various embodiments, the speaker module 245 (e.g., the audio module 170 or the sound output module 155 in FIG. 1) may convert an electrical signal into sound. At least a part of the speaker module 245 may be disposed inside the wearing member 203 of the housing 210. According to an embodiment, the speaker module 245 may be located inside the wearing member 203 to correspond to a user's ear. According to an embodiment (e.g., FIG. 3), the speaker module 245 may be disposed on the circuit board 241. For example, the speaker module 245 may be disposed between the circuit board 241 and inner case (e.g., the inner case 231 in FIG. 5). According to an embodiment (e.g., FIG. 4), the speaker module 245 may be disposed next to the circuit board 241. For example, the speaker module 245 may be disposed between the circuit board 241 and the battery 243.

According to various embodiments, the electronic device 200 may include a connection member 248 that is connected to the speaker module 245 and the circuit board 241. The connection member 248 may transmit at least a part of the sound and/or vibration generated by the speaker module 245 to the circuit board 241. According to an embodiment, the connection member 248 may be integrally formed with the speaker module 245. For example, a portion extending from a speaker frame of the speaker module 245 may be interpreted as a connection member 248. According to an embodiment (e.g., FIG. 3), the connection member 248 may be omitted. For example, when the speaker module 245 is disposed on the circuit board 241, the connection member 248 may be omitted.

According to various embodiments, the power transmission structure 246 may transmit power from the battery 243 to an electronic component (e.g., the light output module 211) of the electronic device 200. For example, the power transmission structure 246 may be electrically connected to the battery 243 and/or the circuit board 241, and the circuit board 241 may transmit, to the light output module 211, power received through the power transmission structure 246.

According to various embodiments, the power transmission structure 246 may be a configuration capable of transmitting power. For example, the power transmission structure 246 may include a flexible printed circuit board or wire. For example, the wire may include a plurality of cables (not illustrated). In various embodiments, the shape of the power transmission structure 246 may be variously modified in consideration of the number and/or type of cables.

According to various embodiments, a microphone module 247 (e.g., the input module 150 and/or the audio module 170 of FIG. 1) may convert sound into an electrical signal. According to an embodiment, a microphone module 247 may be disposed on at least a part of the lens frame 202. For example, at least one microphone module 247 may be disposed at the lower end (e.g., in the direction oriented in the −X axis) and/or at the upper end (e.g., in the direction oriented in the X axis) of the electronic device 200. According to various embodiments, the electronic device 200 may more clearly recognize the user's voice using voice information (e.g., sound) acquired from the at least one microphone module 247. For example, on the basis of the acquired voice information and/or additional information (e.g., low-frequency vibration of the user's skin and bone), the electronic device 200 may distinguish voice information and ambient noise from each other. For example, the electronic device 200 may clearly recognize the user's voice and may perform a function of reducing ambient noise (e.g., noise canceling).

According to various embodiments, the camera module 250 may photograph a still image and/or a moving image. The camera module 250 may include at least one of a lens, at least one image sensor, an image signal processor, or a flash. According to an embodiment, the camera module 250 may be disposed in the lens frame 202 and disposed around the display member 201.

According to various embodiments, the camera module 250 may include at least one first camera module 251. According to an embodiment, the first camera module 251 may photograph the trajectory of the user's eyes (e.g., pupils) or gaze. For example, the first camera module 251 may photograph a reflection pattern of light emitted by a light emitter (e.g., the light emitter 330 in FIG. 5) to the user's eyes. For example, the light emitter 330 may emit light in an infrared band for tracking the trajectory of the gaze using the first camera module 251. For example, the light emitter 330 may include an IR LED. According to an embodiment, in order to make a virtual image projected to the display member 201 correspond to the direction at which the user's pupils gaze, the processor (e.g., the processor 120 in FIG. 1) may adjust the position of the virtual image. According to an embodiment, the first camera module 251 may include a global shutter (GS) type camera, and may track the trajectory of the user's eyes or gaze using a plurality of first camera modules 251 having the same standard and performance.

According to various embodiments, the first camera module 251 may periodically or a periodically transmit information related to the trajectory of the user's eyes or gaze (e.g., trajectory information) to a processor (e.g., the processor 120 in FIG. 1). According to another embodiment, the first camera module 251 may transmit the trajectory information to the processor when detecting that the user's gaze has changed based on the trajectory information (e.g., the eyes move more than a reference value in the state in which the head is not moving).

According to various embodiments, the camera module 250 may include a second camera module 253. According to an embodiment, the second camera module 253 may capture an external image. According to an embodiment, the second camera module 253 may be a global shutter type or a rolling shutter (RS) type camera. According to an embodiment, the second camera module 253 may capture an external image through a second optical hole 223 provided in the second frame 202b. For example, the second camera module 253 may include a high-resolution color camera and may be a high-resolution (HR) or photo-video (PV) camera. In addition, the second camera module 253 may provide an auto focus (AF) function and an optical image stabilizer (OIS) function.

According to various embodiments (not illustrated), the electronic device 200 may include a flash (not illustrated) located adjacent to the second camera module 253. For example, the flash (not illustrated) may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to various embodiments, the camera module 250 may include at least one third camera module 255. According to an embodiment, the third camera module 255 may photograph a user's motion through the first optical hole 221 provided in the lens frame 202. For example, the third camera module 255 may photograph the user's gesture (e.g., a hand gesture). The third camera module 255 and/or first optical hole 221 may be disposed at each of the opposite ends of the lens frame 202 (e.g., the second frame 202b) (e.g., the opposite ends of the lens frame 202 (e.g., the second frame 202b) in the X direction). According to an embodiment, the third camera module 255 may be a global shutter (GS) type camera. For example, the third camera module 255 may provide 360-degree spatial (e.g., omnidirectional), positional, and/or movement recognition using a camera that supports 3 degrees of freedom (DoF) or 6DoF. According to an embodiment, the third camera module 255 may perform a movement path tracking function (simultaneous localization and mapping (SLAM)) and a user movement recognition function using a plurality of global shutter-type cameras of the same standard and performance as stereo cameras. According to an embodiment, the third camera module 255 may include an infrared (IR) camera (e.g., a time of flight (ToF) camera or a structured light camera). For example, the IR camera may be operated as at least a part of a sensor module (e.g., the sensor module 176 in FIG. 1) for detecting a distance to a subject.

According to an embodiment, at least one of the first camera module 251 and the third camera module 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules (not illustrated). For example, the second camera module 253 may include a plurality of lenses (e.g., wide-angle and telephoto lenses) and image sensors and may be disposed on one side (e.g., a surface oriented in the −Y axis) of the electronic device 200. For example, the electronic device 200 may include a plurality of camera modules having different attributes (e.g., angles of view) or functions, respectively, and may control the camera modules to change the angles of view of thereof based on the user's selection and/or trajectory information. For example, at least one of the plurality of camera modules may be a wide-angle camera, and at least one of other camera modules may be a telephoto camera.

According to various embodiments, the processor (e.g., the processor 120 of FIG. 1) may determine the movement of the electronic device 300 and/or the user's movement using the information of the electronic device 200 acquired using at least one of the gesture sensor, the gyro sensor, or the acceleration sensor of the sensor module (e.g., the sensor module 176 in FIG. 1) and the user's movement (e.g., the approach of the user's body to the electronic device 200) acquired using the third camera module 255. According to an embodiment, in addition to the above-described sensors, the electronic device 200 may include a magnetic (geomagnetic) sensor capable of measuring an orientation using a magnetic field and a magnetic field line and/or a Hall sensor capable of acquiring movement information (e.g., a movement direction or a movement distance). For example, the processor may determine the movement of the electronic device 200 and/or the movement of the user based on information acquired from the magnetic (geomagnetic) sensor and/or the Hall sensor.

According to various embodiments (not illustrated), the electronic device 200 may perform an input function (e.g., a touch and/or a pressure detection function) capable of interacting with the user. For example, components configured to perform a touch and/or a pressure detection function (e.g., a touch sensor and/or a pressure sensor) may be disposed on at least a part of the wearing member 203. The electronic device 200 may control the virtual image output through the display member 201 based on the information acquired through the components. For example, the sensors related to a touch and/or a pressure detection function may be configured in various types, such as a resistive type, a capacitive type, an electro-magnetic type (EM), or an optical type. According to an embodiment, the components configured to perform a touch and/or a pressure detection function may be all or partly the same as the configuration of the input module 150 of FIG. 1.

According to various embodiments, the electronic device 200 may include a reinforcing member 260 disposed in the internal space of the lens frame 202 and configured to have a higher rigidity than that of the lens frame 202.

According to various embodiments, the electronic device 200 may include a lens structure 270. The lens structure 270 may refract at least a part of light. For example, the lens structure 270 may be a prescription lens having a specified refractive power. According to various embodiments, the housing 210 may include a hinge cover 227 that is capable of concealing a part of the hinge structure 229. Another portion of the hinge structure 229 may be accommodated or concealed between the inner case 231 and the outer case 233 to be described later.

According to various embodiments, the wearing member 203 may include an inner case 231 and an outer case 233. The inner case 231 is, for example, a case configured to face the user's body or come into direct contact with the user's body, and may be made of a material having a low thermal conductivity (e.g., a synthetic resin). According to an embodiment, the inner case 231 may include an inner surface (e.g., the inner surface 231*c* in FIG. 2) facing the user's body. The outer case 233 may include, for example, a material (e.g., a metal material) capable of at least partially transferring heat, and may be coupled to face the inner case 231. According to an embodiment, the outer case 233 may include an outer surface (e.g., the outer surface 231*d* of FIG. 2) opposite to the inner surface 231*c*. In an embodiment, at least one of the circuit board 241 or the speaker module 245 may be accommodated in a space separated from the battery 243 within the wearing member 203. In the illustrated embodiment, the inner case 231 may include a first case 231*a* including a circuit board 241 and/or a speaker module 245 and a second case 231*b* configured to accommodate the battery 243, and the outer case 233 may include a third case 233*a* coupled to face the first case 231*a* and a fourth case 233*b* coupled to face the second case 231*b*. For example, the first case 231*a* and the third case 233*a* (hereinafter, "first case parts 231*a* and 233*a*") may be coupled to accommodate the circuit board 241 and/or the speaker module 245, and the second case 231*b* and the fourth case 233*b* (hereinafter, "second case parts 231*b* and 233*b*") may be coupled to accommodate the battery 243.

According to various embodiments, the first case parts 231*a* and 233*a* may be rotatably coupled to the lens frame 202 via the hinge structures 229, and the second case parts 231*b* and 233*b* may be connected to or mounted on the ends of the first case parts 231*a* and 233*a* via the connection structures 235. In some embodiments, the portions of the connection structures 235 that come into contact with the user's body may be made of a material having low thermal conductivity (e.g., an elastic material such as silicone, polyurethane, or rubber), and the portions that do not come into contact with the user's body may be made of a material having a high thermal conductivity (e.g., a metal material). For example, when heat is generated from the circuit boards 241 or the batteries 243, the connection structures 235 block heat from being transferred to portions that come into contact with the user's body, and may disperse or release heat through the portions that are not come into contact with the user's body. According to an embodiment, the portions of the connection structures 235 that are configured to come into contact with the user's body may be interpreted as portions of the inner cases 231, and the portions of the connection structures 235 that do not come into contact with the user's body may be interpreted as portions of the outer cases 233. According to an embodiment (not illustrated), the first case 231*a* and the second case 231*b* may be integrally configured without the connection structure 235, and the third case 233*a* and the fourth case 233*b* may be integrally configured to each other without the connection structure 235. According to various embodiments, in addition to the illustrated components, other components (e.g., the antenna module 197 of FIG. 1) may be further included, and by using the communication module 190, information about an object or environment may be received from an external electronic device (e.g., the electronic device 102 or 104 or the server 108 in FIG. 1) using a communication module 190 via a network (e.g., the first network 198 or the second network 199 in FIG. 1).

Figure 6A:
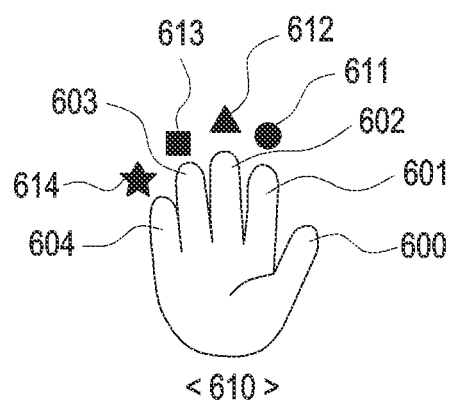
FIG. 6A illustrates embodiments in which an electronic device executes a function corresponding to a user interaction, according to various embodiments.
Figure 6A:
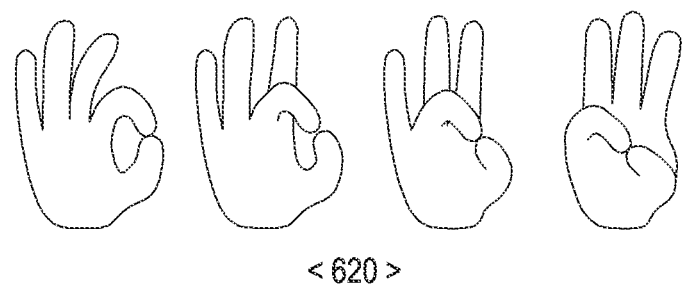
Figure 6A:
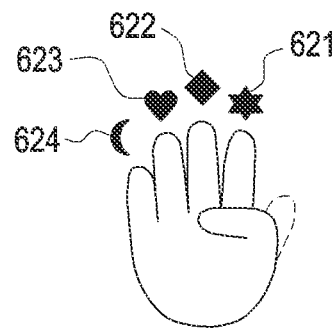
Figure 6A:
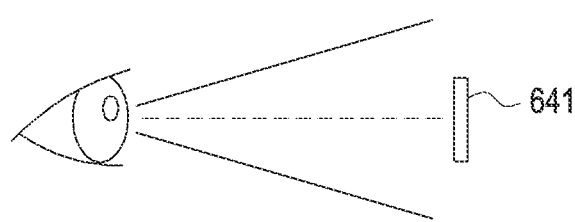
Figure 6A:

FIG. 6A illustrates embodiments in which an electronic device (e.g., the electronic device 101 of FIG. 1) executes a function corresponding to a user interaction, according to various embodiments.

Figure 6B:
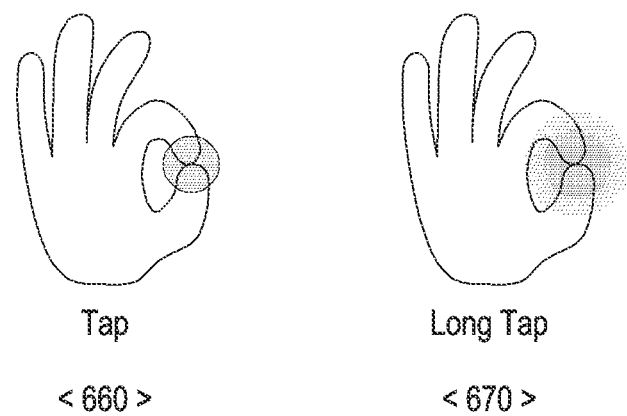
FIG. 6B illustrates embodiments in which an electronic device executes a function corresponding to a user interaction and a duration of the user interaction, according to various embodiments.

FIG. 6B illustrates embodiments in which the electronic device 101 executes a function corresponding to a user interaction and a duration of the user interaction, according to various embodiments.

According to various embodiments, the electronic device 101 (e.g., the processor 120 of FIG. 1) may display at least one object corresponding to at least one function at a position corresponding to at least one finger of a user through a display (e.g., the display module 160 of FIG. 1).

According to an embodiment, the electronic device 101 may recognize a hand of a user wearing the electronic device 101, and when the electronic device 101 recognizes a gesture of a hand of a user other than the user wearing the electronic device 101, the electronic device 101 may ignore the gesture and not perform an operation according to the disclosure. According to an embodiment, when (1) the shape of a hand of the user satisfies a specified condition within a space which is capable of being recognized by the electronic device 101, and/or (2) the gaze of the user is directed toward a palm of the user, the electronic device 101 may display the at least one object corresponding to the at least one function at a position corresponding to at least one finger of the user through the display 160. According to an embodiment, when the shape of the recognized hand is a shape in which a palm is open (e.g., a shape of "paper" in the rock-paper-scissors game), the electronic device 101 may determine that the specified condition is satisfied. For example, referring to <610> of FIG. 6A, when an open palm of the user faces the electronic device 101 within the space which is capable of being recognized by the electronic device 101, and/or (2) the gaze of the user is directed toward the palm, the electronic device 101 may display a first object 611 corresponding to a first function on the upper end of a first finger 601 (e.g., an index finger) through the display 160. In the above-described situation, for another example, the electronic device 101 may display, through the display 160, a second object 612 corresponding to a second function on the upper end of a second finger 602 (e.g., a middle finger), display a third object 613 corresponding to a third function on the upper end of a third finger 603 (e.g., a ring finger), and display a fourth object 614 corresponding to a fourth function on the upper end of a fourth finger 604 (e.g., a little finger).

According to various embodiments, the electronic device 101 (e.g., the processor 120 of FIG. 1) may identify the at least one function corresponding to the at least one finger of the user, based on at least one of a currently executed application or a currently displayed screen. For example, while a first application is executed, the electronic device 101 may identify a first function of the first application corresponding to the first finger 601, a second function of the first application corresponding to the second finger 602, a third function of the first application corresponding to the third finger 603, and a fourth function of the first application corresponding to the fourth finger 604. For another example, while a second application is executed, the electronic device 101 may identify a first function of the second application corresponding to the first finger 601, a second function of the second application corresponding to the second finger 602, a third function of the second application corresponding to the third finger 603, and a fourth function of the second application corresponding to the fourth finger 604. According to an embodiment, the electronic device 101 may designate at least one function to at least one finger according to a configuration of a manufacturer of the electronic device 101 or a configuration of a user. For example, the electronic device 101 may designate a specific function to a specific finger according to a configuration of a manufacturer or a configuration of a user, and display a specific object representing the specific function on the upper end of the specific finger. In this case, based on a user input (e.g., drag and drop) which changes a display position of the specific object from the upper end of a specific finger to the upper end of another finger, the electronic device 101 may designate the specific function to the another finger and display the specific object corresponding to the specific function on the upper end of the another finger. According to various embodiments, the electronic device 101 (e.g., the processor 120 of FIG. 1) may perform various operations according to the disclosure by distinguishing a left hand and a right hand, or perform various operations according to the disclosure in consideration of only the type of a finger without distinguishing a left hand and a right hand. For example, while the first application is executed, the electronic device 101 may designate the first function of the first application to the index finger of a right hand, and designate the second function different from the first function of the first application to the index finger of a left hand. For another example, while the first application is executed, the electronic device 101 may designate the first function of the first application to both the index finger of a right hand and the index finger of a left hand.

According to various embodiments, based on identifying that a prespecified finger is in contact with a specific finger among at least one finger by using a camera (e.g., the camera module 180 of FIG. 1) while a specific application is executed, the electronic device 101 (e.g., the processor 120 of FIG. 1) may execute a specific function corresponding to the specific finger among at least one function of the specific application corresponding to the at least one finger. For example, referring to <620> of FIG. 6A, while the first application is executed, based on identifying that a prespecified finger 600 (e.g., a thumb) is in contact with the first finger 601, the electronic device 101 may execute the first function of the first application corresponding to the first finger 601. For another example, while the first application is executed, based on identifying that the prespecified finger 600 is in contact with a specific finger among the second finger 602 to the fourth finger 604, the electronic device 101 may execute a specific function of the first application corresponding to the specific finger.

According to various embodiments, based on identifying that the prespecified finger 600 performs a prespecified gesture by using the camera 180, the electronic device 101 (e.g., the processor 120 of FIG. 1) may display, through the display 160, at least one additional object corresponding to at least one additional function at a position corresponding to at least one finger of the user. For example, referring to <630> of FIG. 6A, when the electronic device 101 uses the camera 180 to identify that the prespecified finger 600 of the user performs a prespecified gesture (e.g., a gesture of being folded toward a palm and then unfolded), the electronic device 101 may display a first additional object 621 corresponding to a first additional function on the upper end of the first finger 601 through the display 160. In the above-described situation, for another example, the electronic device 101 may display, through the display 160, a second additional object 622 corresponding to a second additional function of the specific application on the upper end of the second finger 602, display a third additional object 623 corresponding to a third additional function on the upper end of the third finger 603, and display a fourth additional object 624 corresponding to a fourth additional function on the upper end of the fourth finger 604. According to an embodiment, when the electronic device 101 identifies that the prespecified finger 600 performs a prespecified gesture by using the camera 180, the electronic device may remove at least one object 611, 612, 613, and 614 being displayed, and display, through the display 160, at least one additional object 622, 623, 624, and 625 at the position corresponding to the at least one finger of the user.

According to various embodiments, based on identifying that the gaze of the user stares at a specific object corresponding to a specific function for a prespecified time, the electronic device 101 (e.g., the processor 120 of FIG. 1) may cause the specific object to correspond to one of the at least one finger. For example, referring to <640> of FIG. 6A, based on identifying that a point corresponding to the gaze of the user indicates a specific object 641 representing a specific function for a prespecified time, the electronic device may cause a specific function executed by the specific object 641 to correspond to the specific finger.

According to various embodiments, based on identifying that a direction of the user's palm facing a first direction is switched to a second direction opposite to the first direction, the electronic device 101 (e.g., the processor 120 of FIG. 1) may perform a historical back function with respect to a screen being displayed. For example, referring to <650> of FIG. 6A, while a first function is executed or a first screen is displayed, based on identifying that the direction of the user's palm facing the first direction is switched to the second direction opposite to the first direction by using the camera 180, a second function is executed before the first function may be executed or a second screen is displayed before the first screen may be displayed.

According to various embodiments, the electronic device 101 (e.g., the processor 120 of FIG. 1) may execute a function corresponding to a user interaction and a duration of the user interaction. According to an embodiment, based on identifying that (1) the prespecified finger 600 is in contact with a specific finger during execution of a specific application, and (2) the duration of the contact is a first time which is less than or equal to a threshold time, the electronic device 101 may execute a first function which is a high priority function of the specific application and corresponds to the specific finger. For example, referring to <660> of FIG. 6B, when (1) the prespecified finger 600 is in contact with the first finger 601 during execution of a specific application, and (2) the duration of the contact is less than or equal to a threshold time, the electronic device 101 may execute a first function which is a high priority function among the first function and a second function of the specific application, the functions corresponding to the first finger 601. According to an embodiment, based on identifying that (1) the prespecified finger 600 is in contact with a specific finger during execution of a specific application, and (2) the duration of the contact is a second time which exceeds a threshold time, the electronic device 101 may execute a second function which is a low priority function of the specific application and corresponds to the specific finger. For example, referring to <670> of FIG. 6B, when (1) the prespecified finger 600 is in contact with the first finger 601 during execution of a specific application, and (2) the duration of the contact exceeds a threshold time, the electronic device 101 may execute a second function which is a low priority function among a first function and the second function of the specific application, the functions corresponding to the first finger 601. According to an embodiment, based on identifying that (1) the prespecified finger 600 is in contact with a specific finger during execution of a specific application, and (2) the duration of the contact is a second time which exceeds a threshold time, the electronic device 101 may execute a first function of the specific application corresponding to the specific finger for the second time period. For example, referring to <670> of FIG. 6B, when (1) the prespecified finger 600 is in contact with the first finger 601 during execution of a specific application, and (2) the duration of the contact exceeds a threshold time, the electronic device 101 may continuously execute a first function of the specific application corresponding to the first finger 601 during the contact time of the fingers 600 and 601.

Figure 7:
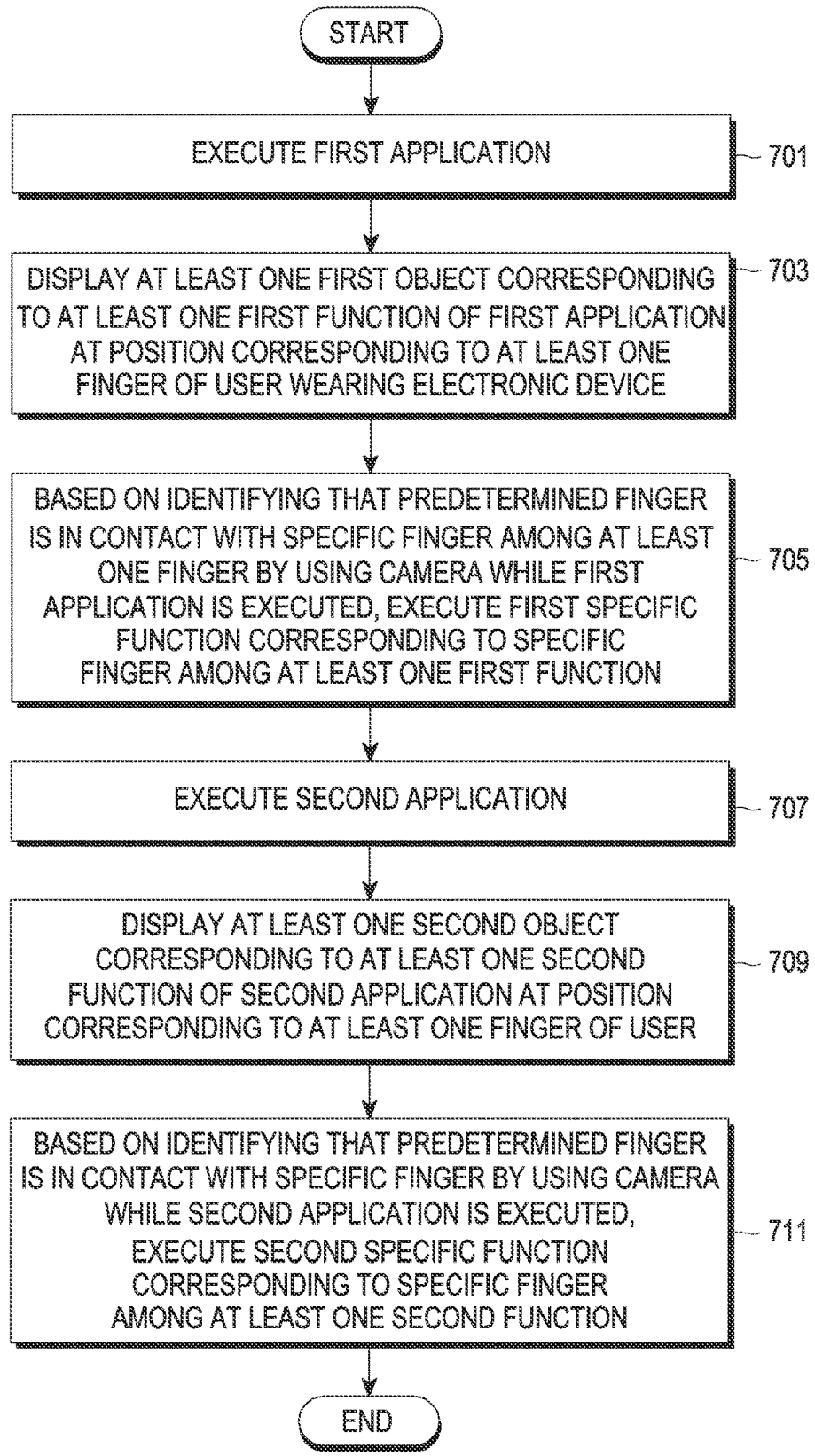
FIG. 7 is a flowchart illustrating an operation in which an electronic device executes a function of an application, based on a user interaction, while the application is executed, according to various embodiments.

FIG. 7 is a flowchart illustrating an operation in which an electronic device (e.g., the electronic device 101 of FIG. 1) executes a function of an application, based on a user interaction, while the application is executed, according to various embodiments.

Figure 8A:
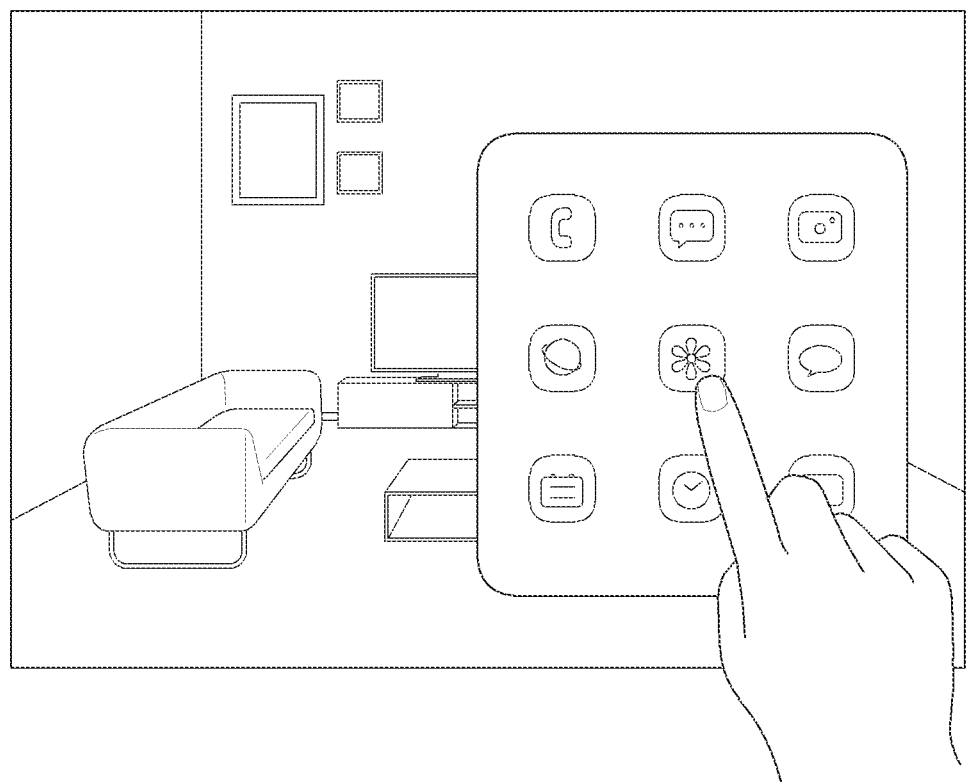
FIG. 8A is a first exemplary diagram illustrating an operation in which an electronic device executes a first specific function of a first application, based on a user interaction, according to various embodiments.

FIG. 8A is a first exemplary diagram illustrating an operation in which the electronic device 101 executes a first specific function of a first application, based on a user interaction, according to various embodiments.

Figure 8B:
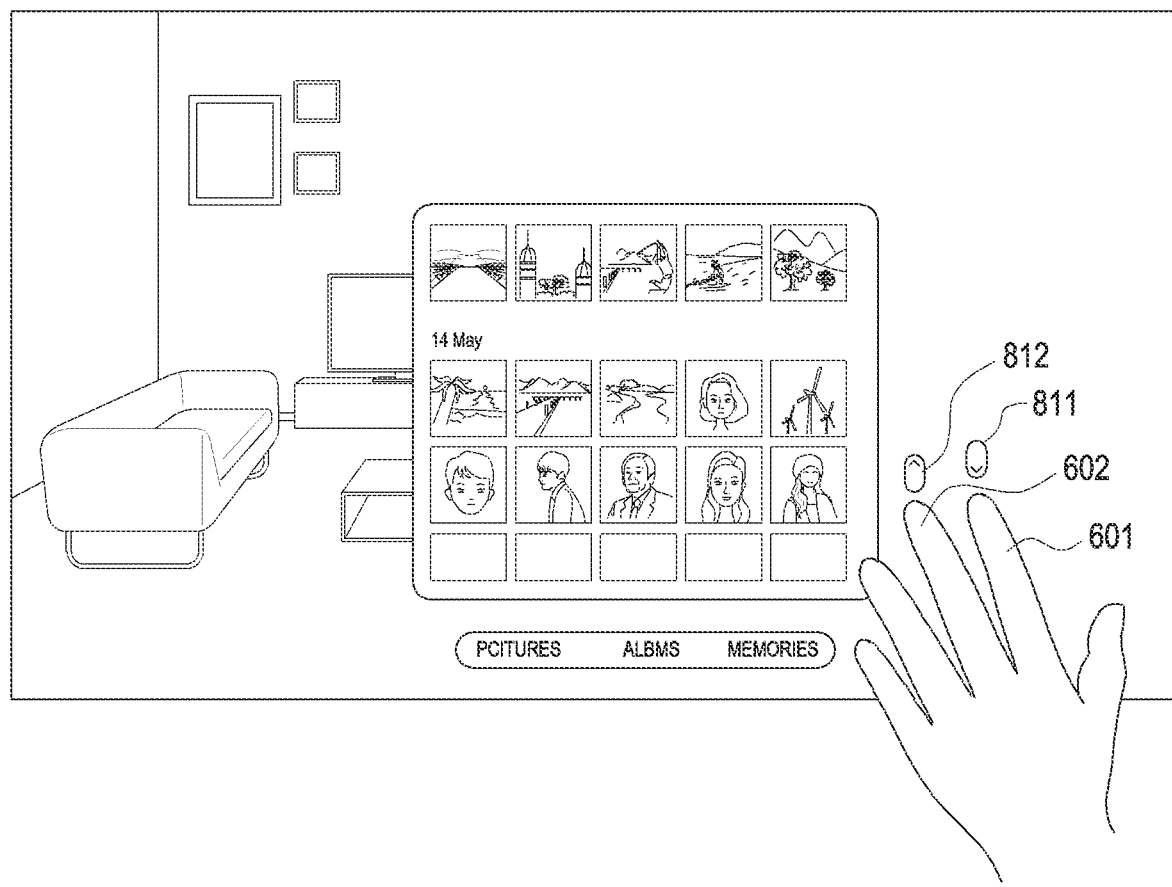
FIG. 8B is a second exemplary diagram illustrating an operation in which an electronic device executes a first specific function of a first application, based on a user interaction, according to various embodiments.

FIG. 8B is a second exemplary diagram illustrating an operation in which the electronic device 101 executes a first specific function of a first application, based on a user interaction, according to various embodiments.

Figure 8C:
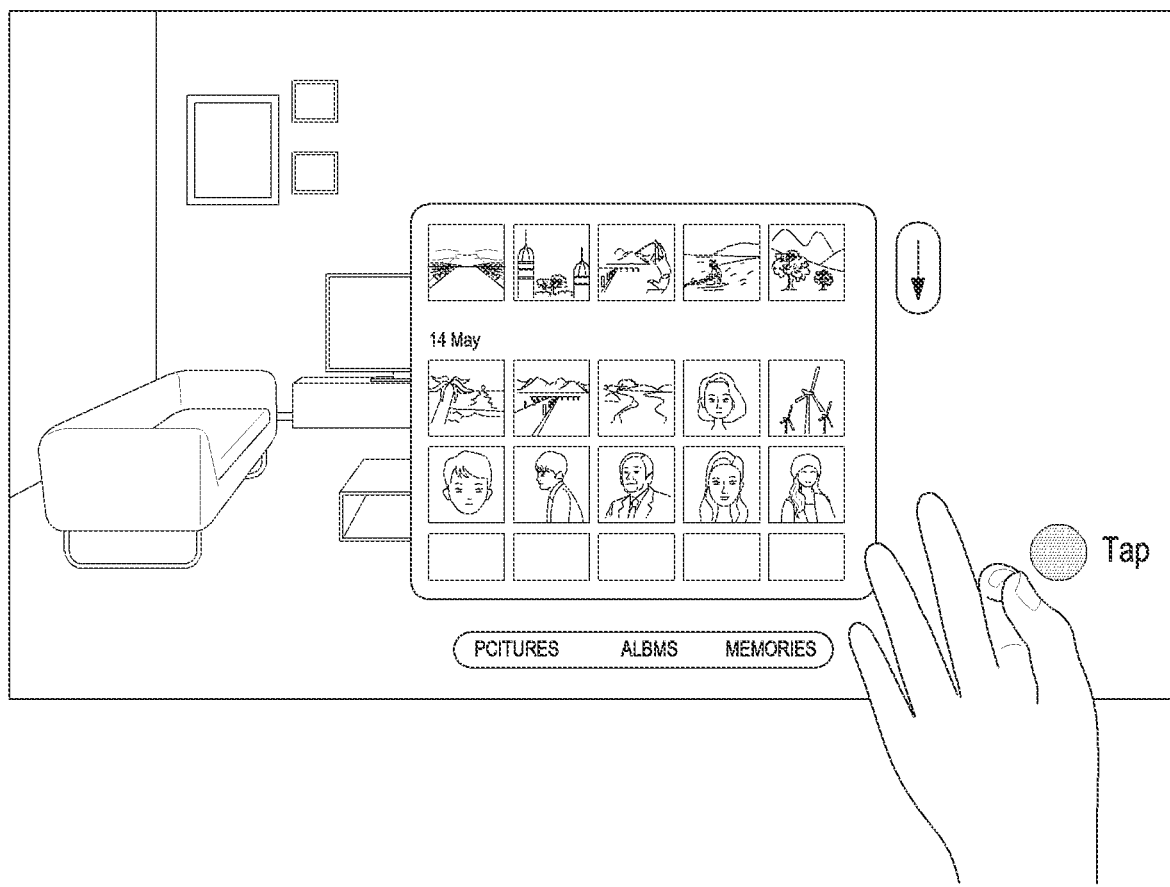
FIG. 8C is a third exemplary diagram illustrating an operation in which an electronic device executes a first specific function of a first application, based on a user interaction, according to various embodiments.

FIG. 8C is a third exemplary diagram illustrating an operation in which the electronic device 101 executes a first specific function of a first application, based on a user interaction, according to various embodiments.

Figure 8D:
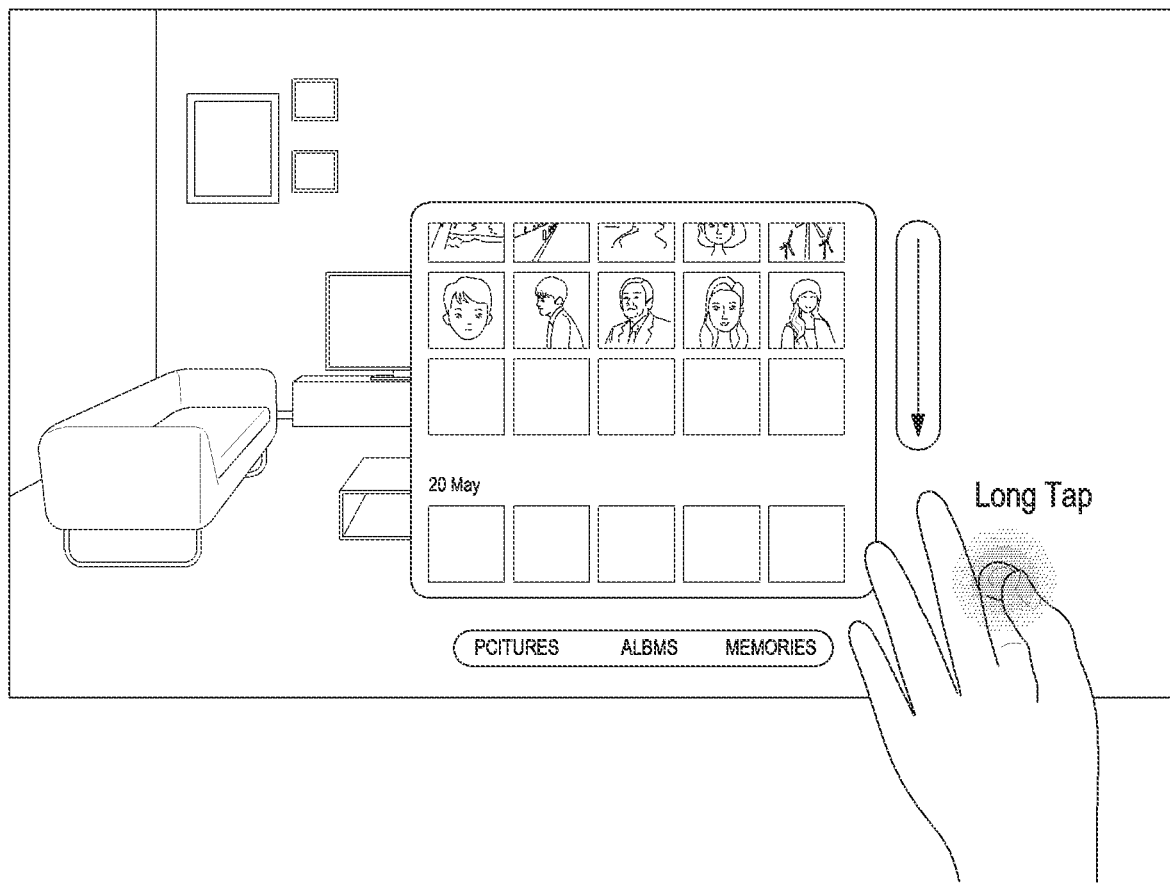
FIG. 8D is a fourth exemplary diagram illustrating an operation in which an electronic device executes a first specific function of a first application, based on a user interaction, according to various embodiments.

FIG. 8D is a fourth exemplary diagram illustrating an operation in which the electronic device 101 executes a first specific function of a first application, based on a user interaction, according to various embodiments.

Figure 9A:
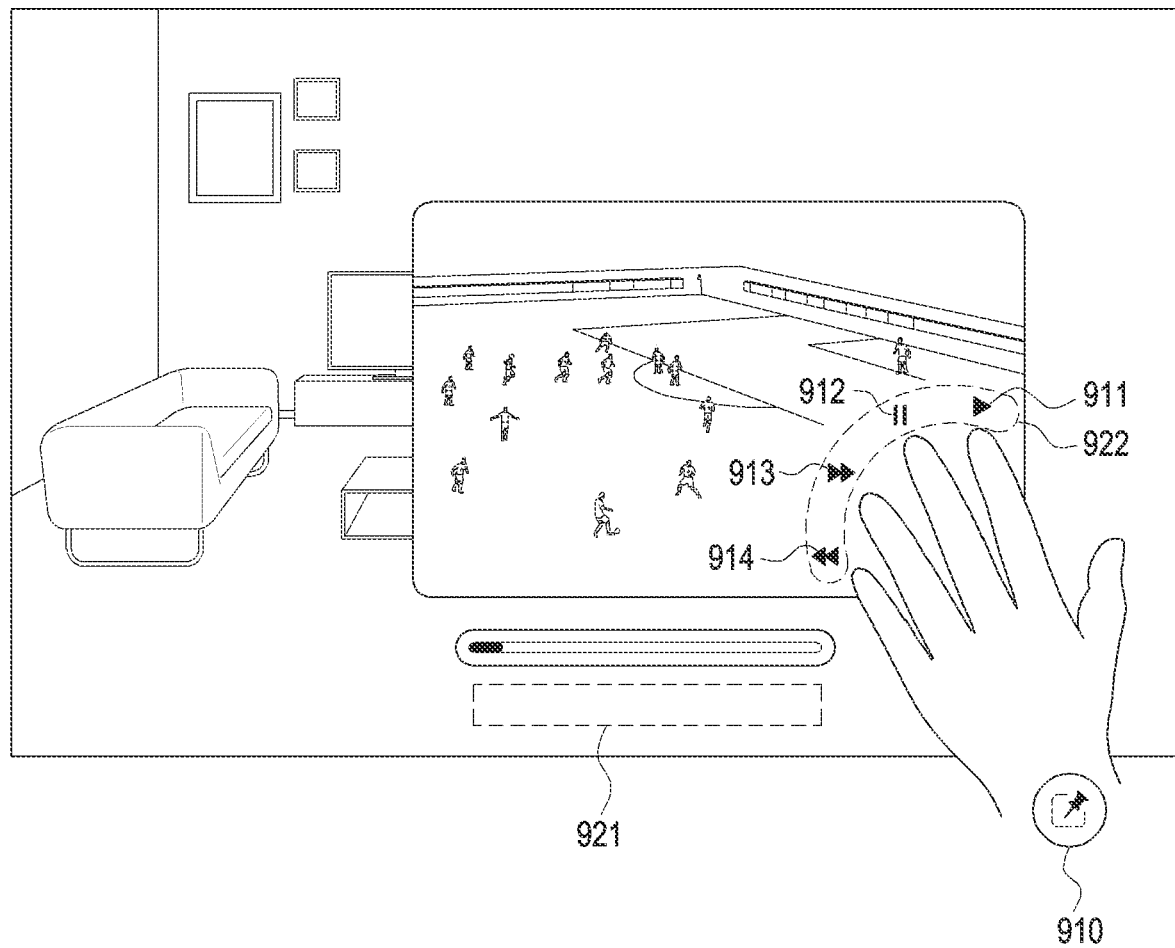
FIG. 9A is a first exemplary diagram illustrating an operation in which an electronic device executes a second specific function of a second application, based on a user interaction, according to various embodiments.

FIG. 9A is a first exemplary diagram illustrating an operation in which the electronic device 101 executes a second specific function of a second application, based on a user interaction, according to various embodiments.

Figure 9B:
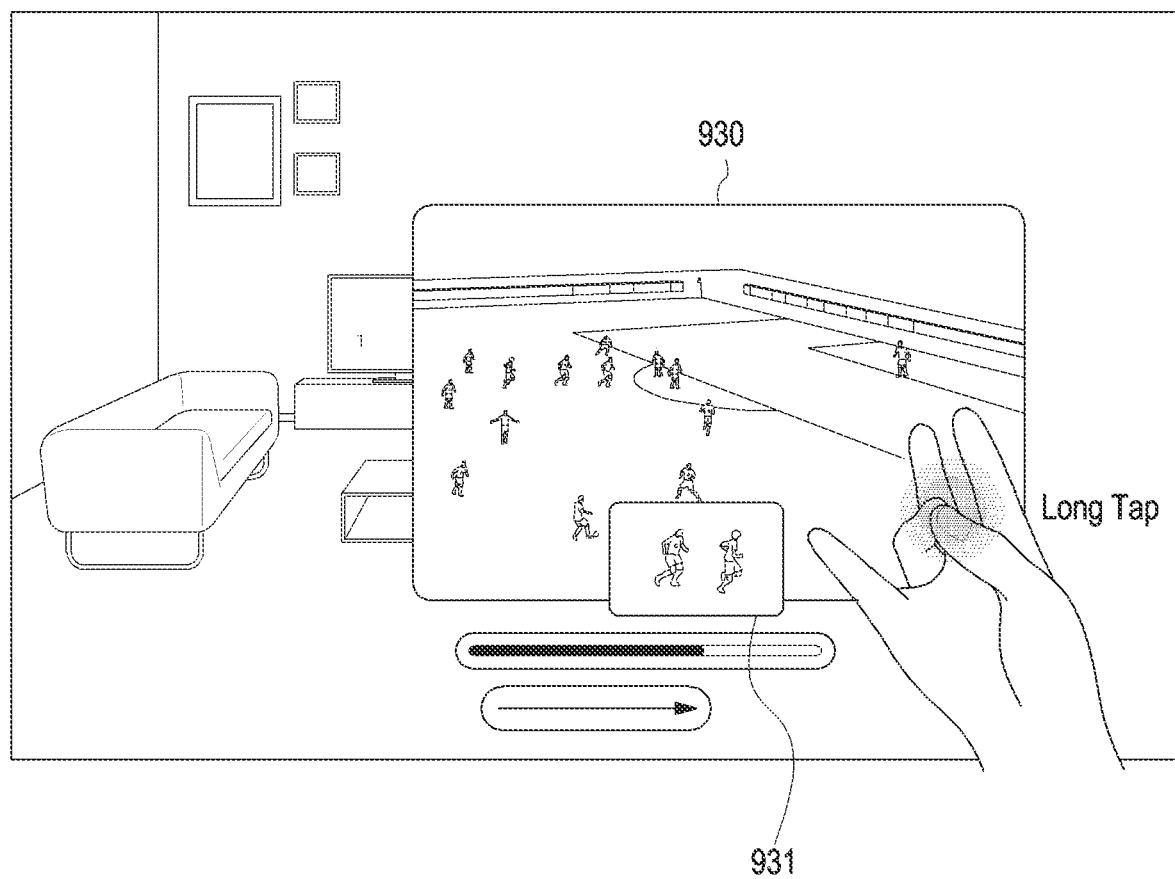
FIG. 9B is a second exemplary diagram illustrating an operation in which an electronic device executes a second specific function of a second application, based on a user interaction, according to various embodiments.

FIG. 9B is a second exemplary diagram illustrating an operation in which the electronic device 101 executes a second specific function of a second application, based on a user interaction, according to various embodiments.

In operation 701, according to various embodiments, an electronic device (e.g., the processor 120 of FIG. 1) may execute a first application. For example, referring to FIG. 8A, on the basis that the electronic device 101 obtains a user interaction of selecting an icon configured to execute a gallery application from a user wearing the electronic device 101, the electronic device may execute the gallery application.

In operation 703, according to various embodiments, based on the execution of the first application, the electronic device 101 (e.g., the processor 120 of FIG. 1) may control a display (e.g., the display module 160 of FIG. 1) to display at least one first object corresponding to at least one first function of the first application at a position corresponding to at least one finger of the user wearing the electronic device 101. According to an embodiment, the electronic device 101 may identify the at least one first function corresponding to the at least one finger of the user, based on the execution of the first application. For example, referring to FIG. 8B, during the execution of the gallery application, when (1) an open palm of the user faces the electronic device 101 within a space which is capable of being recognized by the electronic device 101, and/or (2) the gaze of the user is directed toward the palm, the electronic device 101 may display a first object 811 corresponding to a scroll down function of the gallery application on the upper end of a first finger (e.g., the first finger 601 of FIG. 6A) through the display 160. For another example, referring to FIG. 8B, during the execution of the gallery application, when (1) an open palm of the user faces the electronic device 101 within the space which is capable of being recognized by the electronic device 101, and/or (2) the gaze of the user is directed toward the palm, the electronic device 101 may display a second object 812 corresponding to a scroll up function of the gallery application on the upper end of a second finger (e.g., the second finger 602 of FIG. 6A) through the display 160.

In operation 705, according to various embodiments, based on identifying that a prespecified finger (e.g., the prespecified finger 600 of FIG. 6A) is in contact with a specific finger among the at least one finger by using the camera 180 while the first application is executed, the electronic device (e.g., the processor 120 of FIG. 1) may execute a first specific function corresponding to the specific finger among the at least one first function. For example, referring to FIG. 8C, based on identifying that the prespecified finger 600 is in contact with the first finger 601 by using the camera 180 while the gallery application is executed, the electronic device 101 may execute a scroll down function corresponding to the first finger 601.

According to an embodiment, the electronic device 101 may adjust an execution time of the first specific function of the first application corresponding to the specific finger in proportion to a contact time between the prespecified finger 600 and the specific finger while the first application is executed. For example, referring to FIG. 8C, when the prespecified finger 600 and the first finger 601 are in contact for a short time (e.g., a pinch short tap), the electronic device 101 may adjust an execution time of the scroll down function corresponding to the first finger 601 to be short so as to be proportional to the contact time. For another example, referring to FIG. 8D, when the prespecified finger 600 and the first finger 601 are in contact for a long time (e.g., a pinch long tap), the electronic device 101 may adjust the execution time of the scroll down function corresponding to the first finger 601 to be long so as to be proportional to the contact time.

In operation 707, according to various embodiments, the electronic device (e.g., the processor 120 of FIG. 1) may execute a second application. For example, on the basis that the electronic device 101 obtains a user interaction of selecting an icon configured to execute a video playback application from the user wearing the electronic device 101, the electronic device may execute the video playback application.

In operation 709, according to various embodiments, based on the execution of the second application, the electronic device (e.g., the processor 120 of FIG. 1) may control the display 160 to display at least one second object corresponding to at least one second function of the second application at the position corresponding to the at least one finger of the user wearing the electronic device 101. According to an embodiment, the electronic device 101 may identify the at least one second function corresponding to the at least one finger of the user, based on the execution of the second application. For example, referring to FIG. 9A, while the video playback application is executed, when (1) an open palm of the user faces the electronic device 101 within a space which is capable of being recognized by the electronic device 101, and/or (2) the gaze of the user is directed toward the palm, the electronic device 101 may display, through the display 160, a first object 911 corresponding to a current content playback function of the video playback application on the upper end of the first finger 601, display a second object 912 corresponding to a pause function of the video playback application on the upper end of the second finger 602, display a third object 913 corresponding to a next content playback function of the video playback application on the upper end of the third finger 603, and display a fourth object 914 corresponding to a previous content playback function of the video playback application on the upper end of the fourth finger 604. According to an embodiment, based on the display of a specific content of the second application, the electronic device 101 may change a display position of the at least one second object corresponding to the at least one second function displayed based on the arrangement of the specific content to the position corresponding to the at least one finger of the user. For example, referring to FIG. 9A, while the first object 911 to the fourth object 914 are displayed in a first area 921 with reference to a display position of the specific content of the video playback application, when (1) an open palm of the user faces the electronic device 101 within the space which is capable of being recognized by the electronic device 101, and/or (2) the gaze of the user is directed toward the palm, the electronic device 101 may change display positions of the first object 911 to the fourth object 914 from the first area 921 to a second area 922 corresponding to the upper ends of the first finger 601 to the fourth finger 604.

In operation 711, according to various embodiments, based on identifying that the prespecified finger 600 is in contact with a specific finger among the at least one finger by using the camera 180 while the second application is executed, the electronic device (e.g., the processor 120 of FIG. 1) may execute a second specific function corresponding to the specific finger among the at least one second function. For example, referring to FIG. 9A, based on identifying that the prespecified finger 600 is in contact with the first finger 601 by using the camera 180 while the video playback application is executed, the electronic device 101 may execute the current content playback function corresponding to the first finger 601.

According to an embodiment, based on a user input of selecting a position change request object, the electronic device 101 may change the display position of the at least one second object from a position corresponding to a finger of the user to a position where the at least one second object is originally displayed. For example, referring to FIG. 9A, based on a user input (e.g., a touch tap or a staring gaze) of selecting a position change request object 910 displayed on a wrist of the user, the electronic device 101 may change the display positions of the first object 911 to the fourth object 914 from the second area 922 corresponding to the upper ends of the first finger 601 to the fourth finger 604 to the first area 921 corresponding to the position displayed with reference to the specific content.

According to an embodiment, while the second application is executed, the electronic device 101 may adjust an execution time of the second specific function of the second application corresponding to the specific finger in proportion to a contact time between the prespecified finger 600 and the specific finger. For example, referring to FIG. 9B, when the prespecified finger 600 and the third finger 603 are in contact for a short time (e.g., a pinch short tap), the electronic device 101 may adjust an execution time of a "fast-forward function" corresponding to the third finger 603 to be short so as to be proportional to the contact time. For another example, referring to FIG. 9B, when the prespecified finger 600 and the third finger 603 are in contact for a long time (e.g., a pinch long tap), the electronic device 101 may adjust the execution time of the "fast-forward function" corresponding to the third finger 603 to belong so as to be proportional to the contact time. In this case, while the prespecified finger 600 is in contact with the third finger 603, the electronic device 101 may pause a video currently played back on a main screen 930, and play back a video indicating that the "fast-forward function" is being executed through an auxiliary screen 931 (e.g., a thumbnail screen).

Figure 10A:
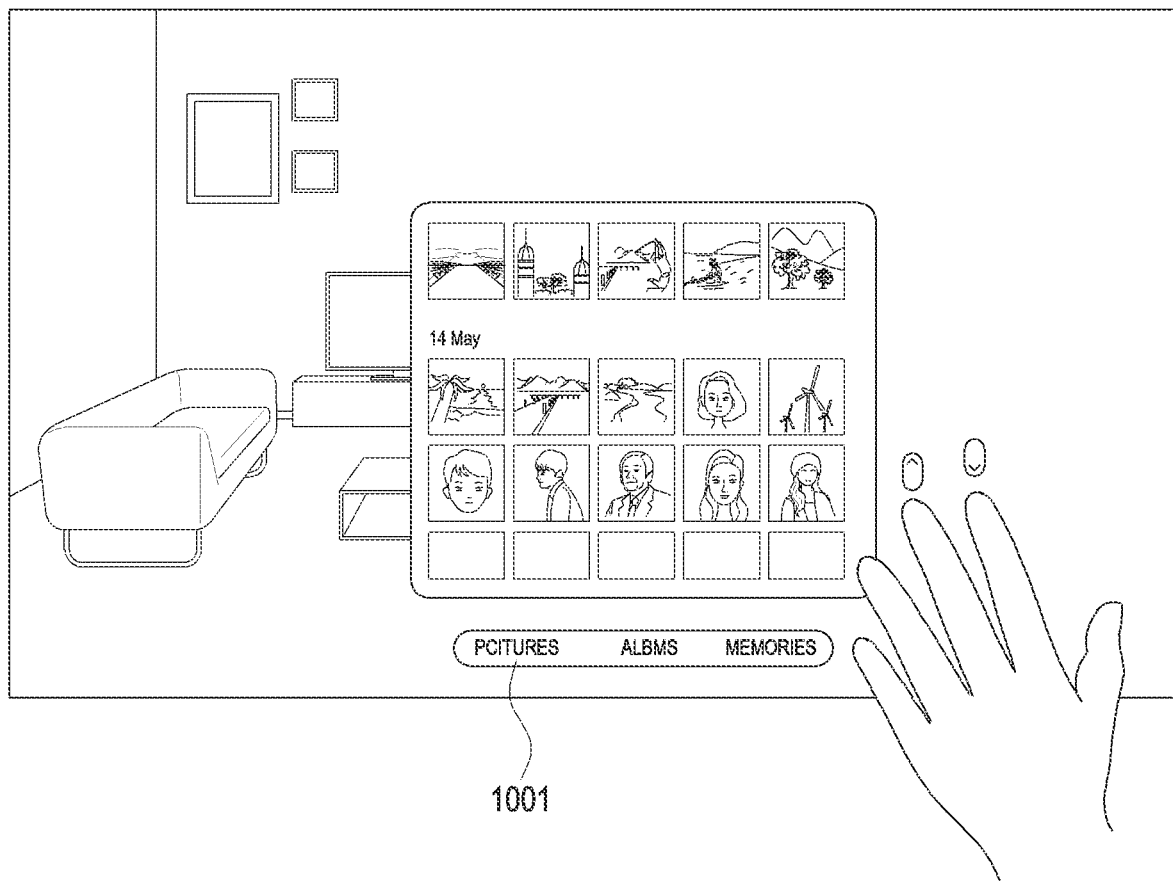
FIG. 10A is a first exemplary diagram illustrating an operation in which an electronic device causes a specific function to correspond to a specific finger, based on a user's gaze, according to various embodiments.

FIG. 10A is a first exemplary diagram illustrating an operation in which an electronic device (e.g., the electronic device 101 of FIG. 1) causes a specific function to correspond to a specific finger, based on a user's gaze, according to various embodiments.

Figure 10B:
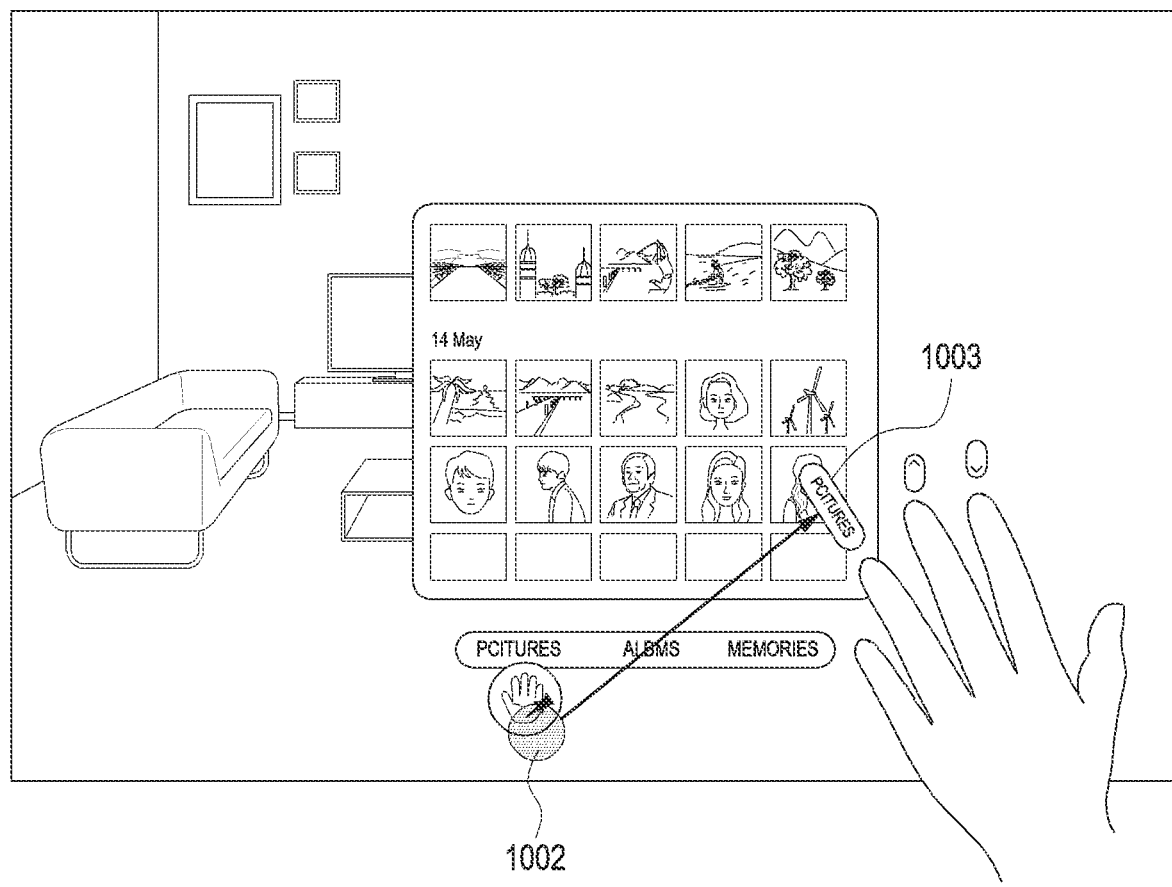
FIG. 10B is a second exemplary diagram illustrating an operation in which an electronic device causes a specific function to correspond to a specific finger, based on a user's gaze, according to various embodiments.

FIG. 10B is a second exemplary diagram illustrating an operation in which the electronic device 101 causes a specific function to correspond to a specific finger, based on a user's gaze, according to various embodiments.

According to various embodiments, the electronic device 101 (e.g., the processor 120 of FIG. 1) may identify that the gaze of a user stares at a first specific object corresponding to a specific function for a predetermined time. For example, referring to FIG. 10A, the electronic device 101 may determine whether the gaze of the user stares at, for a predetermined time, a button 1001 (e.g., a pictures button) for displaying a plurality of pictures.

According to various embodiments, based on identifying that the gaze of the user stares at a first specific object corresponding to a specific function for a prespecified time, the electronic device 101 (e.g., the processor 120 of FIG. 1) may display a second specific object inquiring whether to cause the first specific object to correspond to a specific finger among at least one finger. For example, referring to FIG. 10B, based on identifying that the gaze of the user stares at, for a prespecified time, the first button 1001 (e.g., the pictures button) configured to display a plurality of pictures, the electronic device 101 may display a second button 1002, which inquires whether to cause the button 1001 to correspond to a specific finger, such that the second button is adjacent to the first button 1001 (e.g., at least partially overlap on the first button 1001).

According to various embodiments, based on identifying that the user selects the second specific object, the electronic device 101 (e.g., the processor 120 of FIG. 1) may cause a third specific object configured to execute a specific function executed by the first specific object to a specific finger, and display the third specific object at a position corresponding to the specific finger. For example, referring to FIG. 10B, based on identifying that the user selects the second button 1002, the electronic device 101 may cause a third button 1003 configured to execute a function (e.g., a function of displaying a plurality of pictures) executed by the first button 1001 to correspond to a third finger (e.g., the third finger 603 of FIG. 6A), and display the third button 1003 on the upper end of the third finger 603.

According to various embodiments, the electronic device 101 (e.g., the processor 120 of FIG. 1) may cause the third specific object to correspond to a specific finger, based on a predetermined priority, among one or more fingers to which a specific function is not designated. For example, referring to FIG. 10B, when a priority is configured in the order of the first finger 601 to the fourth finger 604, the electronic device 101 may cause the third button 1003 to correspond to the third finger 603 configured to have a higher priority, between the third finger 603 and the fourth finger 604 to which a specific function is not designated.

According to various embodiments, the electronic device 101 (e.g., the processor 120 of FIG. 1) may cause the third specific object to correspond to a specific finger, based on a user input. For example, referring to FIG. 10B, when the user drags and drops the third button 1003 such that the third button 1003 is positioned on the upper end of the third finger 603, the electronic device 101 may cause the third button 1003 to correspond to the third finger 603.

Figure 11A:
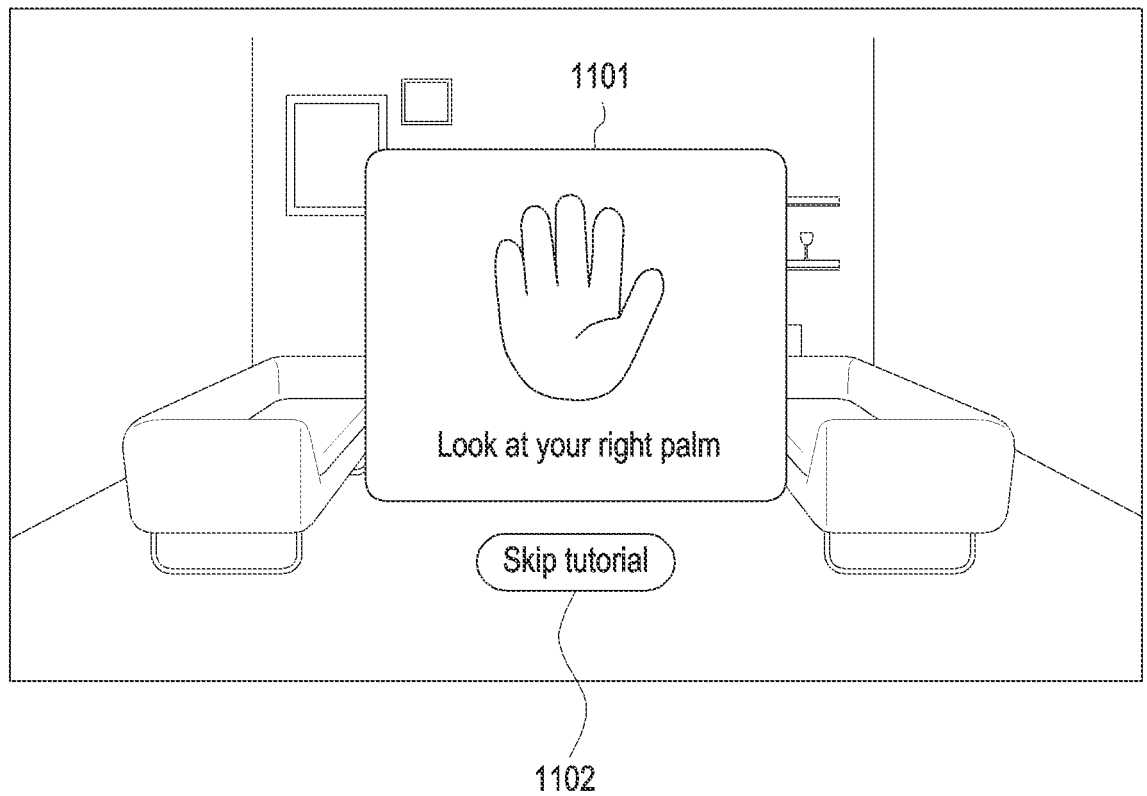
FIG. 11A is a first exemplary diagram illustrating a tutorial function of guiding a mode for executing operations according to the flowchart of FIG. 7, according to various embodiments.

FIG. 11A is a first exemplary diagram illustrating a tutorial function of guiding a mode for executing operations according to the flowchart of FIG. 7, according to various embodiments.

Figure 11B:
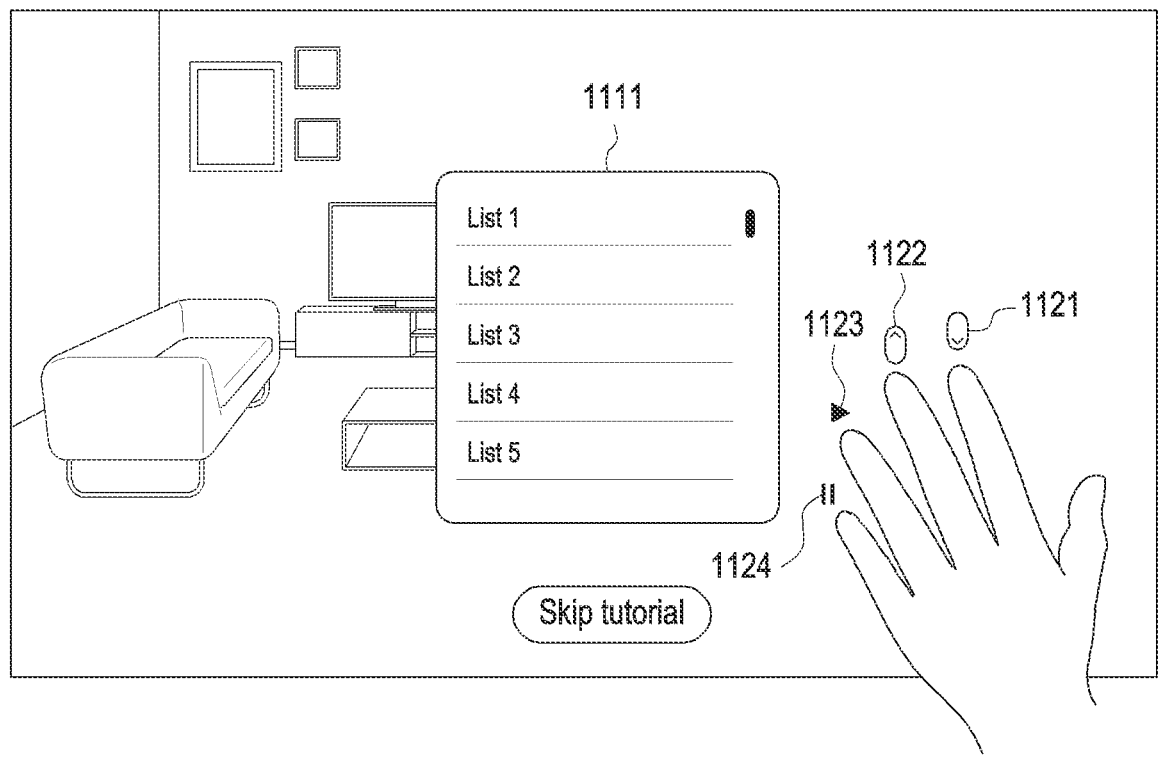
FIG. 11B is a second exemplary diagram illustrating the tutorial function according to various embodiments.

FIG. 11B is a second exemplary diagram illustrating the tutorial function according to various embodiments.

Figure 11C:
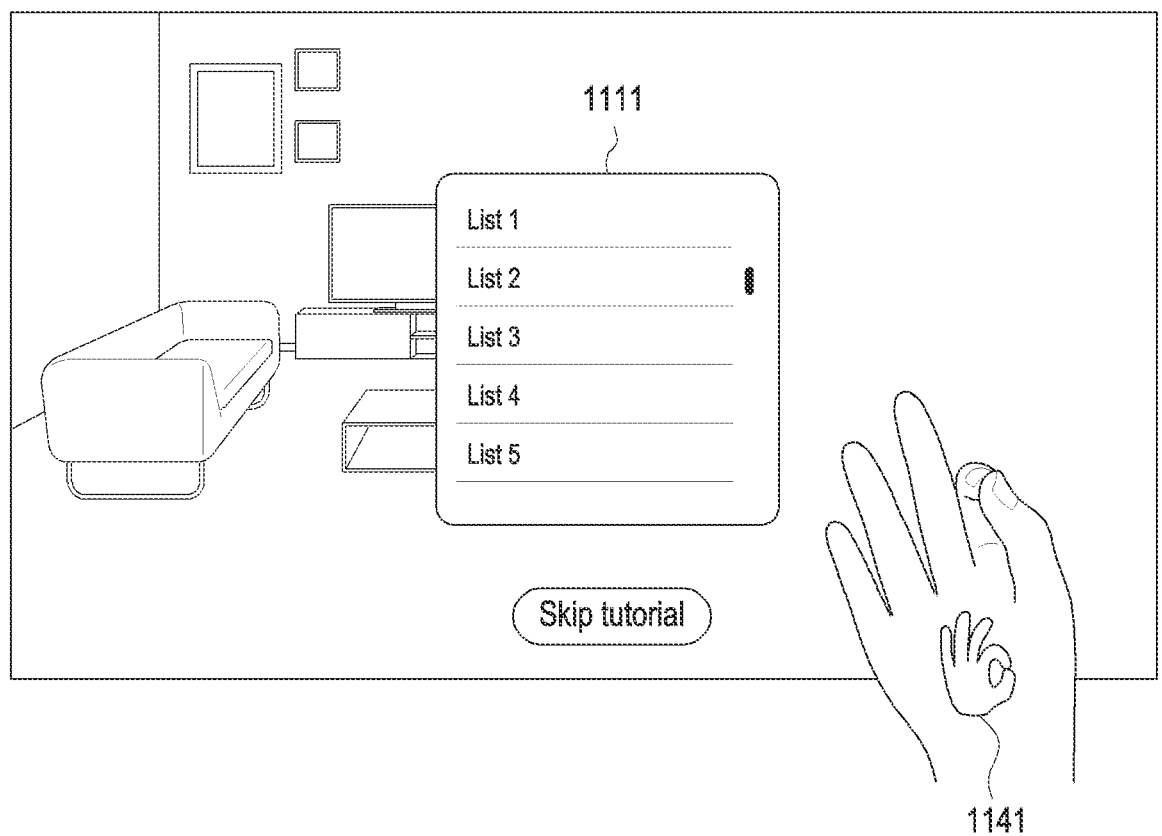
FIG. 11C is a third exemplary diagram illustrating the tutorial function according to various embodiments.

FIG. 11C is a third exemplary diagram illustrating the tutorial function according to various embodiments.

According to various embodiments, in order to guide a mode (e.g., a quick button mode using a pinch tap) for executing the operations according to the flowchart of FIG. 7, the electronic device 101 (e.g., the processor 120 of FIG. 1) may provide a tutorial function of the mode. For example, referring to FIG. 11A, based on the first execution of the quick button mode on the electronic device 101 or based on a request of a user, the electronic device 101 may execute the tutorial function of the quick button mode, and display at least one object 1101 for guiding the quick button mode. For example, while the tutorial function is executed, the electronic device 101 may display a button 1102 for skipping the execution of the tutorial function.

According to various embodiments, while a screen of a specific application is displayed, the electronic device 101 (e.g., the processor 120 of FIG. 1) may display at least one object corresponding to at least one function of the specific application at a position corresponding to at least one finger of the user through a display (e.g., the display module 160 of FIG. 1). For example, referring to FIG. 11B, while a screen 1111 of a music playback application is displayed as a screen for tutorial, when (1) an open palm of the user faces the electronic device 101 within a space which is capable of being recognized by the electronic device 101, and/or (2) the gaze of the user is directed toward the palm, the electronic device 101 may display a first object 1121 corresponding to a scroll down function of the music playback application on the upper end of the first finger 601. In the above-described situation, for another example, the electronic device 101 may display, through the display 160, a second object 1122 corresponding to a scroll up function on the upper end of the second finger 602, display a third object 1123 corresponding to a playback function on the upper end of the third finger 603, and display a fourth object 1124 corresponding to a pause function on the upper end of the fourth finger 604. For example, referring to FIG. 11B, the electronic device 101 may display text (e.g., "a function required according to a situation is matched to a finger") for describing at least one object displayed at a position corresponding to at least one finger.

According to various embodiments, while a screen of a specific application is displayed, the electronic device 101 (e.g., the processor 120 of FIG. 1) may display an object and/or text for describing a specific function corresponding to a specific finger. For example, referring to FIG. 11C, while the screen 1111 of the music playback application is displayed, the electronic device 101 may display an object 1141 and text (e.g., "you can scroll until you tap once or release your hand") for describing the scroll down function corresponding to the first finger 601. According to an embodiment, based on identifying that the prespecified finger 600 is in contact with a specific finger by using a camera (e.g., the camera module 180 of FIG. 1), the electronic device 101 may execute a specific function corresponding to the specific finger. For example, referring to FIG. 11C, while the screen 1111 of the music playback application is displayed, based on identifying that the prespecified finger 600 is in contact with the first finger 601, the electronic device 101 may execute the scroll down function of the music playback application corresponding to the first finger 601.

Figure 12:
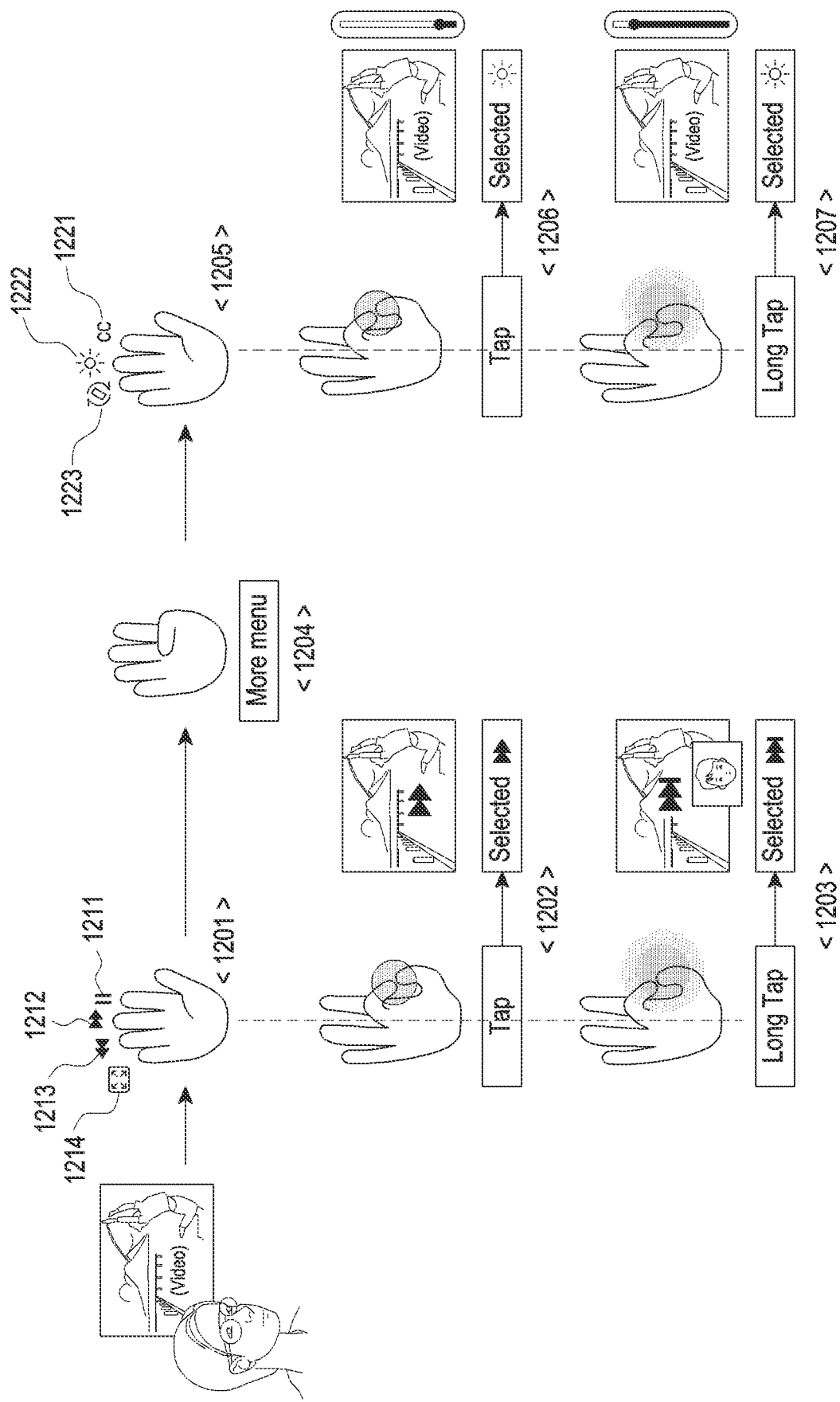
FIG. 12 illustrates an operation in which an electronic device executes a specific function of a video playback application, based on a user interaction, while the video playback application is executed, according to various embodiments.

FIG. 12 illustrates an operation in which an electronic device (e.g., the electronic device 101 of FIG. 1) executes a specific function of a video playback application, based on a user interaction, while the video playback application is executed, according to various embodiments.

According to various embodiments, based on the execution of a specific application, the electronic device 101 (e.g., the processor 120 of FIG. 1) may display at least one object corresponding to at least one function of the specific application at a position corresponding to at least one finger of a user through a display (e.g., the display module 160 of FIG. 1). For example, referring to <1201> of FIG. 12, based on the execution of a video playback application of the electronic device 101, when (1) an open palm of the user faces the electronic device 101 within a space which is capable of being recognized by the electronic device 101, and/or (2) the gaze of the user is directed toward the palm, the electronic device 101 may display a first object 1211 indicating a "pause function" of the video playback application corresponding to the first finger 601 on the upper end of the first finger 601 through the display 160. In the above-described situation, for another example, the electronic device 101 may display, through the display 160, a second object 1212 indicating a "fast-forward function" of the video playback application corresponding to the second finger 602 on the upper end of the second finger 602, display a third object 1213 indicating a "fast-backward function" of the video playback application corresponding to the third finger 603 on the upper end of the third finger 603, and display a fourth object 1214 indicating a "full screen display function" of the video playback application corresponding to the fourth finger 604 on the upper end of the fourth finger 604.

According to various embodiments, while the specific application is executed, the electronic device 101 (e.g., the processor 120 of FIG. 1) may identify a contact time between the prespecified finger 600 and a specific finger by using a camera (e.g., the camera module 180 of FIG. 1), and adjust an execution time of a specific function of the specific application corresponding to the specific finger in proportion to the contact time. For example, referring to <1202> of FIG. 12, when the prespecified finger 600 and the second finger 602 are in contact for a short time (e.g., a pinch short tap), the electronic device 101 may adjust an execution time of the "fast-forward function" corresponding to the second finger 602 to be short (e.g., fast-forward 10 seconds) so as to be proportional to the contact time. For another example, referring to <1203> of FIG. 12, when the prespecified finger 600 and the second finger 602 are in contact for a long time (e.g., a pinch long tap), the electronic device 101 may adjust the execution time of the "fast-forward function" corresponding to the second finger 602 to be long so as to be proportional to the contact time. In this case, while the prespecified finger 600 is in contact with the second finger 602, the electronic device 101 may pause a video currently played back on a main screen, and play back a video indicating that the "fast-forward function" is being executed through an auxiliary screen 1203a (e.g., a thumbnail screen).

According to various embodiments, while the specific application is executed, the electronic device 101 (e.g., the processor 120 of FIG. 1) may identify that the prespecified finger 600 performs a prespecified gesture by using the camera 180. For example, referring to <1204> of FIG. 12, while the video playback application is executed, the electronic device 101 may identify that the prespecified finger 600 of the user performs a prespecified gesture (e.g., a gesture of being folded toward a palm and then unfolded) by using the camera 180.

According to various embodiments, based on identifying that the prespecified finger 600 performs the prespecified gesture, the electronic device 101 (e.g., the processor 120 of FIG. 1) may display, through the display 160, at least one additional object corresponding to at least one additional function of the specific application at the position corresponding to the at least one finger of the user. For example, referring to <1205> of FIG. 12, when it is identified that the predetermined finger 600 of the user performs a predetermined gesture (e.g., a gesture of being folded toward a palm and then unfolded), the electronic device 101 may display, through the display 160, a first additional object 1221 indicating a "closed caption (CC) function" of the video playback application corresponding to the first finger 601 on the upper end of the first finger 601. In the above-described situation, for another example, the electronic device 101 may display, through the display 160, a second additional object 1222 indicating a "brightness control function" of the video playback application corresponding to the second finger 602 on the upper end of the second finger 602, and display a third additional object 1223 indicating a "screen rotation function" of the video playback application corresponding to the third finger 603 on the upper end of the third finger 603.

According to various embodiments, while the specific application is executed after designating the at least one additional function, the electronic device 101 (e.g., the processor 120 of FIG. 1) may identify a contact time between the prespecified finger 600 and a specific finger by using the camera 180, and adjust a change amount of a specific element for an additional function of the specific application corresponding to the specific finger, in proportion to the contact time. For example, referring to <1206> of FIG. 12, when the predetermined finger 600 and the second finger 602 are in contact for a short time (e.g., a pinch short tap), the electronic device 101 may increase a brightness element of the "brightness control function" of the video playback application corresponding to the second finger 602 by a first amount (e.g., one space) corresponding to the contact time. For another example, referring to <1207> of FIG. 12, when the predetermined finger 600 and the second finger 602 are in contact for a long time (e.g., a pinch long tap), the electronic device 101 may increase the brightness element for the "brightness control function" of the video playback application corresponding to the second finger 602 by a second amount (e.g., three spaces) corresponding to the contact time.

Figure 13:
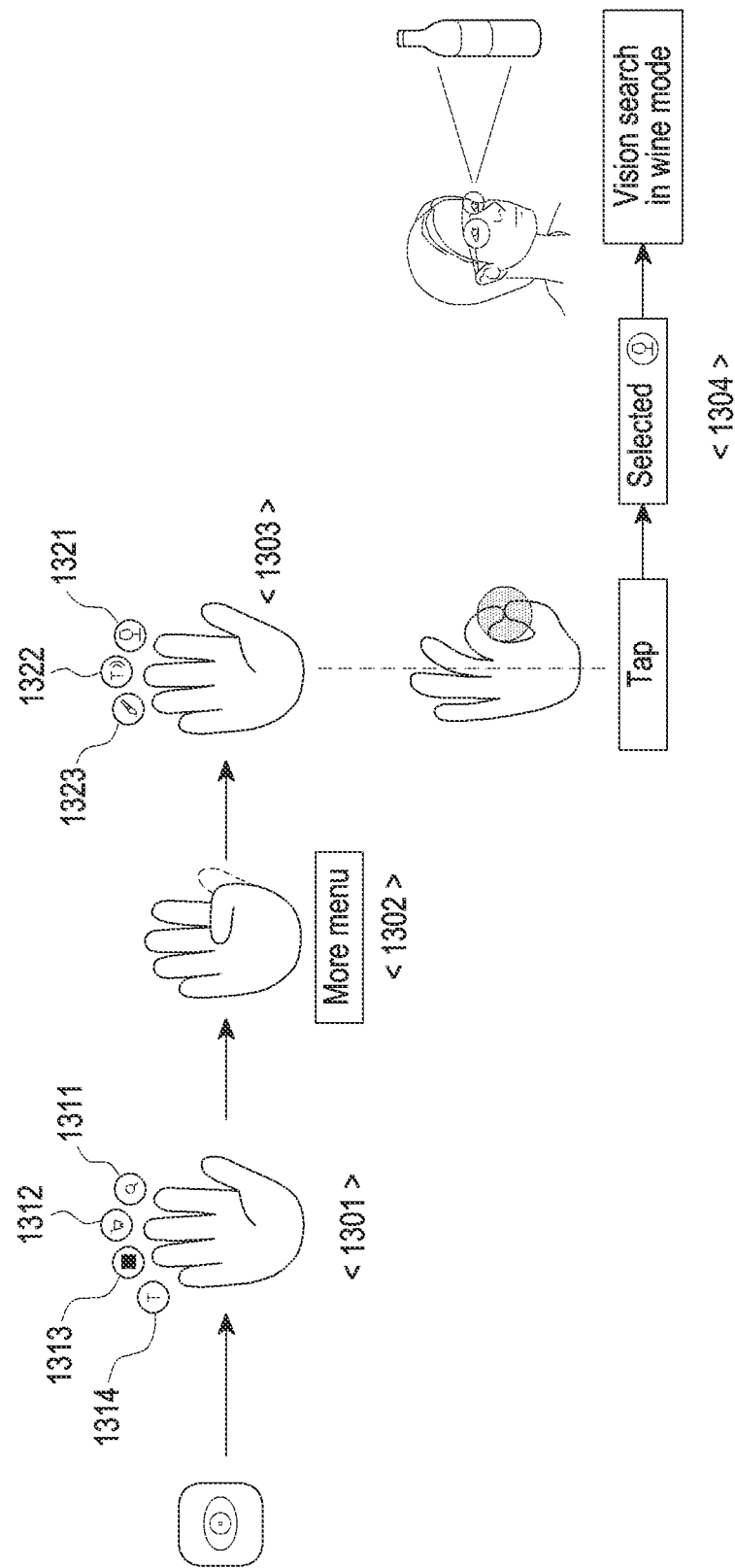
FIG. 13 illustrates an operation in which an electronic device executes a specific function of an object recognition application, based on a user interaction, while the object recognition application is executed, according to various embodiments.

FIG. 13 illustrates an operation in which an electronic device (e.g., the electronic device 101 of FIG. 1) executes a specific function of an object recognition application, based on a user interaction, while the object recognition application is executed, according to various embodiments.

According to various embodiments, based on the execution of a specific application, the electronic device 101 (e.g., the processor 120 of FIG. 1) may display at least one object corresponding to at least one function of the specific application at a position corresponding to at least one finger of a user through a display (e.g., the display module 160 of FIG. 1). For example, referring to <1301> of FIG. 13, based on the execution of an object recognition application (e.g., Bixby Vision) of the electronic device 101, when (1) an open palm of the user faces the electronic device 101 within a space which is capable of being recognized by the electronic device 101, and/or (2) the gaze of the user is directed toward the palm, the electronic device 101 may display, through the display 160, a first object 1311 indicating a first function of the object recognition application corresponding to the first finger 601 on the upper end of the first finger 601. In the above-described situation, for another example, the electronic device 101 may display, through the display 160, a second object 1312 indicating a second function of the object recognition application corresponding to the second finger 602 on the upper end of the second finger 602, display a third object 1313 indicating a third function of the object recognition application corresponding to the third finger 603 on the upper end of the third finger 603, and display a fourth object 1314 indicating a fourth function of the object recognition application corresponding to the fourth finger 604 on the upper end of the fourth finger 604.

According to various embodiments, while the specific application is executed, the electronic device 101 (e.g., the processor 120 of FIG. 1) may identify that the prespecified finger 600 performs a prespecified gesture by using the camera 180. For example, referring to <1302> of FIG. 13, while the object recognition application is executed, the electronic device 101 may identify that the prespecified finger 600 of the user performs a prespecified gesture (e.g., a gesture of being folded toward a palm and then unfolded) by using the camera 180.

According to various embodiments, based on identifying that the prespecified finger 600 performs the prespecified gesture, the electronic device 101 (e.g., the processor 120 of FIG. 1) may display, through the display 160, at least one additional object corresponding to at least one additional function of the specific application at the position corresponding to the at least one finger of the user. For example, referring to <1303> of FIG. 13, when it is identified that the prespecified finger 600 of the user performs a prespecified gesture (e.g., a gesture of being folded toward a palm and then unfolded), the electronic device 101 may display, through the display 160, a first additional object 1321 indicating a first additional function of the object recognition application corresponding to the first finger 601 on the upper end of the first finger 601. In the above-described situation, for another example, the electronic device 101 may display, through the display 160, a second additional object 1322 indicating a second additional function of the object recognition application corresponding to the second finger 602 on the upper end of the second finger 602, and display a third additional object 1323 indicating a third additional function of the object recognition application corresponding to the third finger 603 on the upper end of the third finger 603.

According to various embodiments, while the specific application is executed after designating the at least one additional function, based on identifying that the prespecified finger 600 is in contact with a specific finger among the at least one finger by using the camera 180, the electronic device 101 (e.g., the processor 120 of FIG. 1) may execute an additional function corresponding to the specific finger. For example, referring to <1304> of FIG. 13, based on identifying that the prespecified finger 600 is in contact with the first finger 601 by using the camera 180 while the object recognition application is executed, the electronic device 101 may execute the first additional function (e.g., a wine mode) corresponding to the first finger 601.

Figure 14:
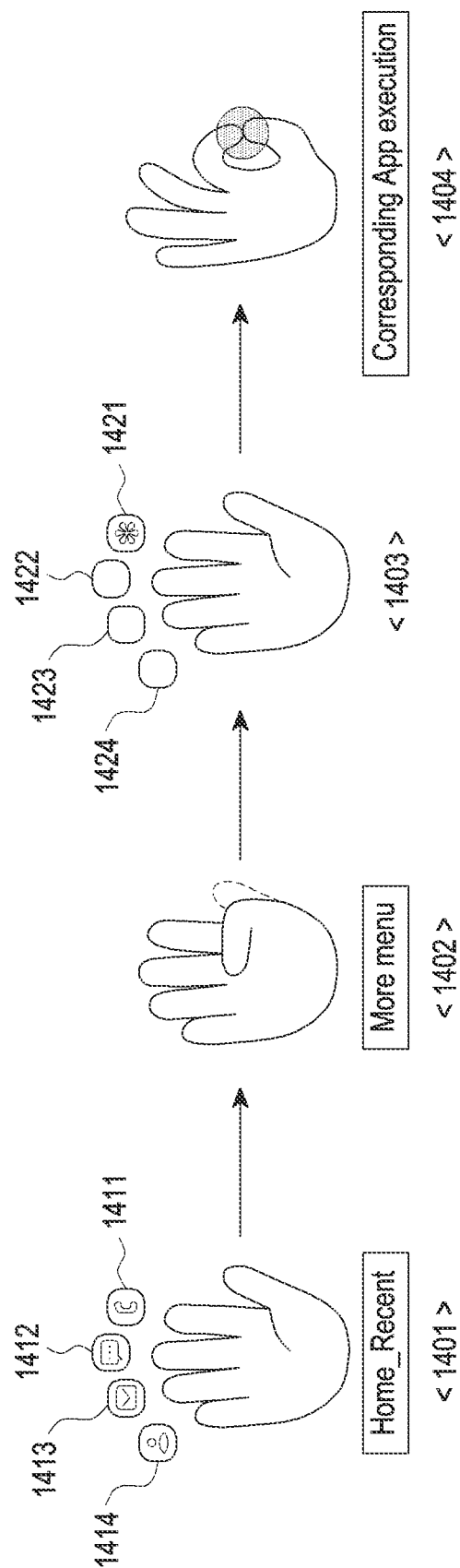
FIG. 14 illustrates an operation in which an electronic device executes a specific application related to a home screen, based on a user interaction, while the home screen is displayed, according to various embodiments.

FIG. 14 illustrates an operation in which an electronic device (e.g., the electronic device 101 of FIG. 1) executes a specific application related to a home screen, based on a user interaction, while the home screen is displayed, according to various embodiments.

According to various embodiments, based on the display of a specific screen, the electronic device 101 (e.g., the processor 120 of FIG. 1) may display at least one object corresponding to at least one function at a position corresponding to at least one finger of a user through a display (e.g., the display module 160 of FIG. 1). For example, referring to <1401> of FIG. 14, while the electronic device 101 displays a home screen, when (1) an open palm of the user faces the electronic device 101 within a space which is capable of being recognized by the electronic device 101, and/or (2) the gaze of the user is directed toward the palm, the electronic device 101 may display, through the display 160, a first object 1411 indicating a call application corresponding to the first finger 601 on the upper end of the first finger 601. In the above-described situation, for another example, the electronic device 101 may display, through the display 160, a second object 1412 indicating a message application corresponding to the second finger 602 on the upper end of the second finger 602, display a third object 1413 indicating a mail application corresponding to the third finger 603 on the upper end of the third finger 603, and display a fourth object 1414 indicating a contact information application corresponding to the fourth finger 604 on the upper end of the fourth finger 604. According to an embodiment, each of objects displayed at positions corresponding to fingers, respectively, may be an object selected by a configuration of a user or a configuration of a manufacturer from among a plurality of objects displayed on the home screen.

According to various embodiments, while the specific screen is displayed, the electronic device 101 (e.g., the processor 120 of FIG. 1) may identify that the prespecified finger 600 performs a prespecified gesture by using the camera 180. For example, referring to <1402> of FIG. 14, while the home screen is displayed, the electronic device 101 may identify that the prespecified finger 600 of the user performs a prespecified gesture (e.g., a gesture of being folded toward a palm and then unfolded) by using the camera 180.

According to various embodiments, based on identifying that the prespecified finger 600 performs the prespecified gesture, the electronic device 101 (e.g., the processor 120 of FIG. 1) may display, through the display 160, at least one additional object corresponding to at least one additional function at the position corresponding to the at least one finger of the user. For example, referring to <1403> of FIG. 14, when it is identified that the prespecified finger 600 of the user performs a prespecified gesture (e.g., a gesture of being folded toward a palm and then unfolded), the electronic device 101 may display, through the display 160, a first additional object 1421 indicating a first additional application (e.g., a gallery application) corresponding to the first finger 601 on the upper end of the first finger 601. In the above-described situation, for another example, the electronic device 101 may display, through the display 160, a second additional object 1422 indicating a second additional application corresponding to the second finger 602 on the upper end of the second finger 602, display a third additional object 1423 indicating a third additional application corresponding to the third finger 603 on the upper end of the third finger 603, and display a fourth additional object 1424 indicating a fourth additional application corresponding to the fourth finger 604 on the upper end of the fourth finger 604.

According to various embodiments, while the specific screen is displayed after designating the at least one additional function, based on identifying that the prespecified finger 600 is in contact with a specific finger among the at least one finger by using the camera 180, the electronic device 101 (e.g., the processor 120 of FIG. 1) may execute an additional function corresponding to the specific finger. For example, referring to <1404> of FIG. 14, while the home screen is displayed, based on identifying that the prespecified finger 600 is in contact with the first finger 601 by using the camera 180, the electronic device 101 may execute the first additional application (e.g., a gallery application) corresponding to the first finger 601.

Figure 15:
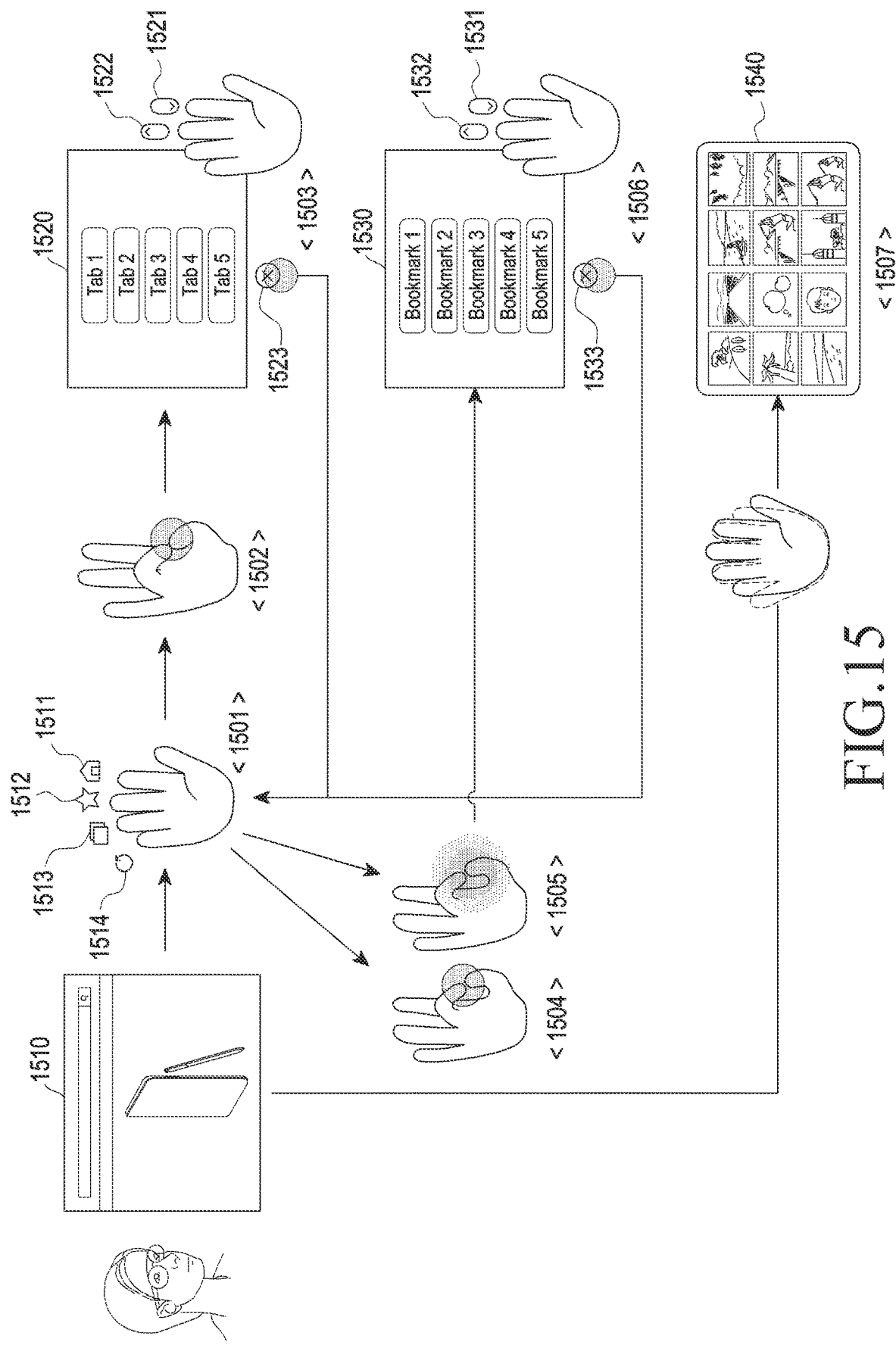
FIG. 15 illustrates an operation in which an electronic device executes a specific function of a web browser, based on a user interaction, while the web browser is executed, according to various embodiments.

FIG. 15 illustrates an operation in which an electronic device (e.g., the electronic device 101 of FIG. 1) executes a specific function of a web browser, based on a user interaction, while the web browser is executed, according to various embodiments.

According to various embodiments, while a first screen of a web browser is displayed, the electronic device 101 (e.g., the processor 120 of FIG. 1) may control a display (e.g., the display module 160 of FIG. 1) to display at least one object indicating at least one function executable on the first screen of the web browser at a position corresponding to at least one finger of a user wearing the electronic device 101. For example, referring to <1501> of FIG. 15, while the electronic device 101 displays a first screen 1510 of the web browser, when (1) an open palm of the user faces the electronic device 101 within a space which is capable of being recognized by the electronic device 101, and/or (2) the gaze of the user is directed toward the palm, the electronic device 101 may display, through the display 160, a first object 1511 indicating a first function executable on the first screen 1510 of the web browser on the upper end of the first finger 601. In the above-described situation, for another example, the electronic device 101 may display, through the display 160, a second object 1512 indicating a second function executable on the first screen 1510 of the web browser on the upper end of the second finger 602, display a third object 1513 indicating a third function executable on the first screen 1510 of the web browser on the upper end of the third finger 603, and display a fourth object 1514 indicating a fourth function executable on the first screen 1510 of the web browser on the upper end of the fourth finger 604.

According to various embodiments, while the first screen 1510 of the web browser is displayed, based on identifying that the prespecified finger 600 is in contact with a specific finger by using the camera 180, the electronic device 101 (e.g., the processor 120 of FIG. 1) may execute a specific function executable on the first screen 1510 corresponding to the specific finger. For example, referring to <1502> of FIG. 15, while the first screen 1510 is displayed, based on identifying that the prespecified finger 600 is in contact with the third finger 603, the electronic device 101 may execute the third function (e.g., a visited web page history display function) executable on the first screen 1510 corresponding to the third finger 603. According to an embodiment, as a screen being displayed through the first screen 1510 is changed, the electronic device 101 may display at least one object indicating at least one function executable on the changed screen of the web browser at the position corresponding to the at least one finger of the user. For example, referring to <1503> of FIG. 15, as the screen being displayed through the web browser is switched from the first screen 1510 to a second screen 1520 (e.g., a visited web page history), the electronic device 101 may display a first object 1521 indicating a first function executable on the second screen 1520 on the upper end of the first finger 601, and display a second object 1522 indicating a second function executable on the second screen 1520 on the upper end of the second finger 602. In this case, based on a user input of selecting a close button 1523, the electronic device 101 may end the display of the second screen 1520, display the first screen 1510, and again display at least one object indicating at least one function executable on the first screen 1510 at the position corresponding to the at least one finger of the user.

According to various embodiments, based on identifying that (1) the prespecified finger 600 is in contact with a specific finger during the display of the first screen 1510 of the web browser, and (2) the duration of the contact is a first time which is less than or equal to a threshold time, the electronic device 101 (e.g., the processor 120 of FIG. 1) may execute a high priority function executable on the first screen 1510. For example, referring to <1504> of FIG. 15, when (1) the prespecified finger 600 is in contact with the second finger 602 during the display of the first screen 1510 of the web browser, and (2) the duration of the contact is less than or equal to the threshold time, the electronic device 101 may perform a high priority function among a high priority function (e.g., bookmarks the current page) and a low priority function (e.g., displays a bookmark list) which are executable on the first screen 1510.

According to various embodiments, based on identifying that (1) the prespecified finger 600 is in contact with a specific finger during the display of the first screen 1510 of the web browser, and (2) the duration of the contact is a second time exceeding the threshold time, the electronic device 101 (e.g., the processor 120 of FIG. 1) may execute a low priority function executable on the first screen 1510. For example, referring to <1505> and <1506> of FIG. 15, when (1) the prespecified finger 600 is in contact with the second finger 602 during the display of the first screen 1510 of the web browser, and (2) the duration of the contact exceeds the threshold time, the electronic device 101 may display a third screen 1530 on which a low priority function (e.g., a bookmark list display function) executable on the first screen 1510 is executed. According to an embodiment, as a screen being displayed through the web browser is changed, the electronic device 101 may display at least one object indicating at least one function executable on the changed screen of the web browser at the position corresponding to the at least one finger of the user. For example, referring to <1506> of FIG. 15, as the screen being displayed through the web browser is switched from the first screen 1510 to the third screen 1530, the electronic device 101 may display a first object 1531 indicating a first function executable on the third screen 1530 on the upper end of the first finger 601, and display a second object 1532 indicating a second function executable on the third screen 1530 on the upper end of the second finger 602. In this case, based on a user input of selecting a close button 1533, the electronic device 101 may end the display of the third screen 1530, display the first screen 1510, and again display at least one object indicating at least one function executable on the first screen 1510 at the position corresponding to the at least one finger of the user.

According to various embodiments, based on identifying that a direction of the user's palm facing a first direction is switched to a second direction opposite to the first direction, the electronic device 101 (e.g., the processor 120 of FIG. 1) may perform a historical back function with respect to a currently displayed screen. For example, referring to <1507> of FIG. 15, while the first screen 1510 is displayed through the web browser, based on identifying that the direction of the user's palm facing the first direction is switched to the second direction opposite to the first direction by using the camera 180, the electronic device 101 may switch a screen displayed through the web browser from the first screen 1510 to a fourth screen 1540 (e.g., a screen displayed before the first screen 1510).

Figure 16:
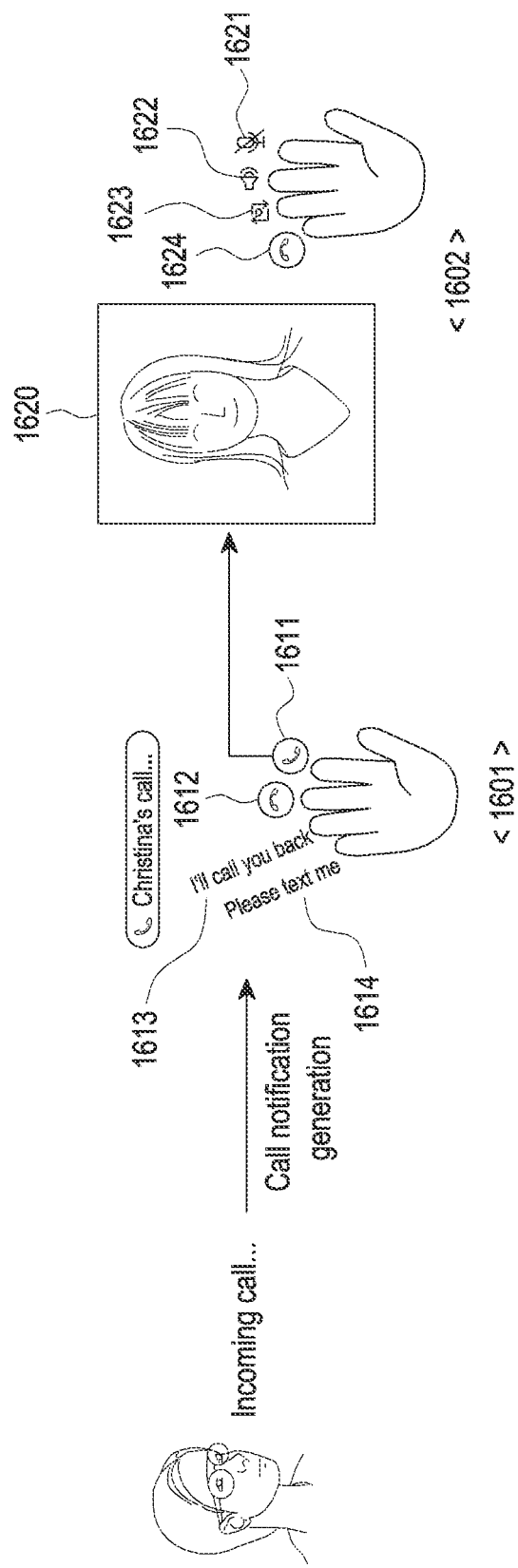
FIG. 16 illustrates an operation in which an electronic device executes a specific function of a call application, based on a user interaction, while a call is received, according to various embodiments.

FIG. 16 illustrates an operation in which an electronic device (e.g., the electronic device 101 of FIG. 1) executes a specific function of a call application, based on a user interaction, while a call is received, according to various embodiments.

According to various embodiments, while a call is received through a call application, the electronic device 101 (e.g., the processor 120 of FIG. 1) may control a display (e.g., the display module 160 of FIG. 1) to display at least one object indicating at least one function of the call application at a position corresponding to at least one finger of a user wearing the electronic device 101. For example, referring to <1601> of FIG. 16, while the electronic device 101 receives a call from an external electronic device (e.g., the electronic device 102 of FIG. 1) through the call application, when (1) an open palm of the user faces the electronic device 101 within a space which is capable of being recognized by the electronic device 101, and/or (2) the gaze of the user is directed toward the palm, the electronic device 101 may display, through the display 160, a first object 1611 indicating a first function (e.g., a call connection acceptance function) of the call application on the upper end of the first finger 601. In the above-described situation, for another example, the electronic device 101 may display, through the display 160, a second object 1612 indicating a second function (e.g., a call reception rejection function) of the call application on the upper end of the second finger 602, display a third object 1613 indicating a third function (e.g., a call reception rejection and/or predetermined first text transmission function) of the call application on the upper end of the third finger 603, and display a fourth object 1614 indicating a fourth function (e.g., a call reception rejection and/or predetermined second text transmission function) of the call application on the upper end of the fourth finger 604.

According to various embodiments, while a call is received through the call application, based on identifying that the prespecified finger 600 is in contact with a specific finger by using the camera 180, the electronic device 101 (e.g., the processor 120 of FIG. 1) may execute a specific function of the call application corresponding to the specific finger. For example, referring to <1601> and <1602> of FIG. 16, while a call is received through the call application, based on identifying that the prespecified finger 600 is in contact with the first finger 601, the electronic device 101 may execute the first function (e.g., a call connection acceptance function) of the call application corresponding to the first finger 601, and display a screen 1620 related to call establishment while establishing a call with the external electronic device 102 requesting the call. For example, referring to <1602> of FIG. 16, during the establishment of a call, while displaying the screen 1620 through the display 160, the electronic device 101 may display a first object 1621 indicating an executable function with respect to the established call on the upper end of the first finger 601, display a second object 1622 indicating an executable function with respect to the established call on the upper end of the second finger 602, display a third object 1623 indicating an executable function with respect to the established call on the upper end of the third finger 603, and display a fourth object 1624 indicating an executable function with respect to the established call on the upper end of the fourth finger 604.

Figure 17:
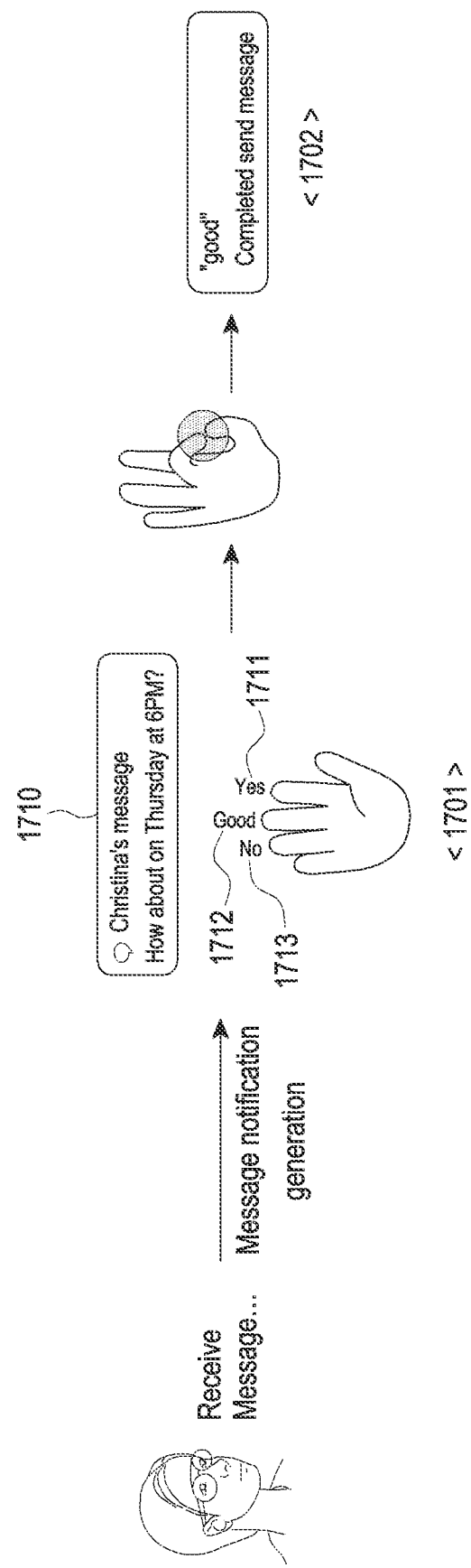
FIG. 17 illustrates an operation in which an electronic device transmits a response to a received message, based on a user interaction, while the received message is displayed, according to various embodiments.

FIG. 17 illustrates an operation in which an electronic device (e.g., the electronic device 101 of FIG. 1) transmits a response to a received message, based on a user interaction, while the received message is displayed, according to various embodiments.

According to various embodiments, based on receiving a message from an external electronic device (e.g., the electronic device 102 of FIG. 1), the electronic device 101 (e.g., the processor 120 of FIG. 1) may control a display (e.g., the display module 160 of FIG. 1) to display at least one object indicating at least one message capable of responding to the received message at a position corresponding to at least one finger of a user wearing the electronic device 101. According to an embodiment, the electronic device 101 may analyze the content of the received message by using a natural language understanding module, and generate at least one response message capable of responding to the message. For example, referring to <1701> of FIG. 17, while the electronic device 101 displays a received message 1710, when (1) an open palm of the user faces the electronic device 101 within a space which is capable of being recognized by the electronic device 101, and/or (2) the gaze of the user is directed toward the palm, the electronic device 101 may display, through the display 160, a first object 1711 indicating a first message capable of responding to the received message 1710 on the upper end of the first finger 601. In the above-described situation, for another example, the electronic device 101 may display, through the display 160, a second object 1712 indicating a second message capable of responding to the received message 1710 on the upper end of the second finger 602, and display a third object 1713 indicating a third message capable of responding to the received message 1710 on the upper end of the third finger 603.

According to various embodiments, while the received message 1710 is displayed, based on identifying that the prespecified finger 600 is in contact with a specific finger by using the camera 180, the electronic device 101 (e.g., the processor 120 of FIG. 1) may transmit a message corresponding to the specific finger to the external electronic device 102. For example, referring to <1701> and <1702> of FIG. 17, while the received message 1710 is displayed, based on identifying that the prespecified finger 600 is in contact with the second finger 602, the electronic device 101 may transmit the second message (e.g., good) corresponding to the second finger 602 to the external electronic device 102.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a wearable electronic device (e.g., the electronic device 101 of FIG. 1) may include a display (e.g., the display module 160 of FIG. 1), a camera (e.g., the camera module 180 of FIG. 1), and a processor (e.g., the processor 120 of FIG. 1), wherein the processor is configured to, based on execution of a first application, control the display to display at least one first object (e.g., the first object 611 to the fourth object 614 of FIG. 6A) corresponding to at least one first function of the first application at a position (e.g., the first finger 601 to the fourth finger 604 of FIG. 6A) corresponding to at least one finger of a user wearing the wearable electronic device, based on identifying that a prespecified finger (e.g., the prespecified finger 600 of FIG. 6A) is in contact with a specific finger among the at least one finger by using the camera while the first application is executed, execute a first specific function corresponding to the specific finger among the at least one first function, based on execution of a second application, control the display to display at least one second object corresponding to at least one second function of the second application at the position corresponding to the at least one finger, and based on identifying that the prespecified finger is in contact with the specific finger by using the camera while the second application is executed, execute a second specific function corresponding to the specific finger among the at least one second function.

According to various embodiments, the processor may be configured to identify the at least one first function corresponding to the at least one finger, based on the execution of the first application.

According to various embodiments, the processor may be configured to, when (1) a shape of a hand of the user satisfies a specified condition within a space which is capable of being recognized by the wearable electronic device, and/or (2) gaze of the user is directed toward a palm of the user, control the display to display the at least one first object at the position corresponding to the at least one finger.

According to various embodiments, the processor may be configured to, while the at least one first object is displayed in a first area (e.g., the first area 921 of FIG. 9A), based on arrangement of a specific content of the first application, when (1) the palm in an open state faces the wearable electronic device within the space, and/or (2) the gaze of the user is directed toward the palm, change a display position of the at least one first object from the first area to a second area (e.g., the second area 922 of FIG. 9A) which is the position corresponding to the at least one finger.

According to various embodiments, the processor may be configured to, based on identifying that gaze of the user stares at a first object (e.g., the button 1001 of FIG. 10A) corresponding to a first function of the first application for a prespecified time, control the display to display a second object (e.g., the button 1002 of FIG. 10B) inquiring whether to cause the first object to correspond to a first finger, and based on identifying that the user selects the second object, control the display to cause a third object (e.g., the button 1003 of FIG. 10B) configured to execute the first function to correspond to the first finger and to display the third object at a position corresponding to the first finger.

According to various embodiments, the processor may be configured to, based on identifying that the prespecified finger performs a prespecified gesture by using the camera while the first application is executed, control the display to display at least one additional object corresponding to at least one additional function of the first application at the position corresponding to the at least one finger.

According to various embodiments, the processor may be configured to adjust an execution time of the first specific function corresponding to the specific finger in proportion to a contact time between the prespecified finger and the specific finger while the first application is executed.

According to various embodiments, the processor may be configured to, when (1) the prespecified finger is in contact with the specific finger during the execution of the first application, and (2) a duration of the contact is less than or equal to a threshold time, execute a high priority function of the first application corresponding to the specific finger.

According to various embodiments, the processor may be configured to, when (1) the prespecified finger is in contact with the specific finger during the execution of the first application, and (2) a duration of the contact exceeds a threshold time, execute a low priority function of the first application corresponding to the specific finger.

According to various embodiments, the processor may be configured to, based on identifying that a direction of the user's palm facing a first direction is switched to a second direction opposite to the first direction by using the camera, execute a historical back function with respect to a currently displayed screen of the first application.

According to various embodiments, an operation method of a wearable electronic device may include, based on execution of a first application, controlling a display of the wearable electronic device to display at least one first object corresponding to at least one first function of the first application at a position corresponding to at least one finger of a user wearing the wearable electronic device, based on identifying that a prespecified finger is in contact with a specific finger among the at least one finger by using a camera of the wearable electronic device while the first application is executed, executing a first specific function corresponding to the specific finger among the at least one first function, based on execution of a second application, controlling the display to display at least one second object corresponding to at least one second function of the second application at the position corresponding to the at least one finger, and based on identifying that the prespecified finger is in contact with the specific finger by using the camera while the second application is executed, executing a second specific function corresponding to the specific finger among the at least one second function.

According to various embodiments, the controlling of the display to display the at least one first object may include identifying the at least one first function corresponding to the at least one finger, based on the execution of the first application.

According to various embodiments, the controlling of the display to display the at least one first object may include, when (1) a shape of a hand of the user satisfies a specified condition within a space which is capable of being recognized by the wearable electronic device, and/or (2) gaze of the user is directed toward a palm of the user, controlling the display to display the at least one first object at the position corresponding to the at least one finger.

According to various embodiments, the controlling of the display to display the at least one first object may include, while the at least one first object is displayed in a first area, based on arrangement of a specific content of the first application, when (1) the palm in an open state faces the wearable electronic device within the space, and/or (2) the gaze of the user is directed toward the palm, changing a display position of the at least one first object from the first area to a second area which is the position corresponding to the at least one finger.

According to various embodiments, the operation method of the wearable electronic device may further include, based on identifying that gaze of the user stares at a first object corresponding to a first function of the first application for a prespecified time, controlling the display to display a second object inquiring whether to cause the first object to correspond to a first finger, and based on identifying that the user selects the second object, controlling the display to cause a third object configured to execute the first function to correspond to the first finger and to display the third object at a position corresponding to the first finger.

According to various embodiments, the operation method of the wearable electronic device may further include, based on identifying that the prespecified finger performs a prespecified gesture by using the camera while the first application is executed, controlling the display to display at least one additional object corresponding to at least one additional function of the first application at the position corresponding to the at least one finger.

According to various embodiments, the executing of the first specific function may include adjusting an execution time of the first specific function corresponding to the specific finger in proportion to a contact time between the prespecified finger and the specific finger while the first application is executed.

According to various embodiments, the executing of the first specific function may include, when (1) the prespecified finger is in contact with the specific finger during the execution of the first application, and (2) a duration of the contact is less than or equal to a threshold time, executing a high priority function of the first application corresponding to the specific finger.

According to various embodiments, the executing of the first specific function may include, when (1) the prespecified finger is in contact with the specific finger during the execution of the first application, and (2) a duration of the contact exceeds a threshold time, executing a low priority function of the first application corresponding to the specific finger.

According to various embodiments, the operation method of the wearable electronic device may further include, based on identifying that a direction of the user's palm facing a first direction is switched to a second direction opposite to the first direction by using the camera, executing a historical back function with respect to a currently displayed screen of the first application.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A wearable electronic device comprising:
 a display;
 a camera;
 a processor; and
 memory storing instructions, being executable by the processor, which cause the wearable electronic device to:

based on execution of a first application, control the display to display at least one first object corresponding to at least one first function of the first application at a position corresponding to at least one finger of a user wearing the wearable electronic device, based on identifying that a prespecified finger is in contact with a specific finger among the at least one finger by using the camera while the first application is executed, execute a first specific function corresponding to the specific finger among the at least one first function, based on execution of a second application, control the display to display at least one second object corresponding to at least one second function of the second application at the position corresponding to the at least one finger, based on identifying that the prespecified finger is in contact with the specific finger by using the camera while the second application is executed, execute a second specific function corresponding to the specific finger among the at least one second function, based on identifying that a gaze of the user stares at a first object corresponding to a first function of the first application for a prespecified time, control the display to display a second object inquiring whether to cause the first object to correspond to a first finger, and based on identifying that the user selects the second object, control the display to cause a third object configured to execute the first function to correspond to the first finger and to display the third object at a position corresponding to the first finger.

2. The wearable electronic device of claim 1, wherein the memory further stores instructions, being executable by the processor, which cause the wearable electronic device to identify the at least one first function corresponding to the at least one finger, based on the execution of the first application.

3. The wearable electronic device of claim 1, wherein the memory further stores instructions, being executable by the processor, which cause the wearable electronic device to, when (1) a shape of a hand of the user satisfies a specified condition within a space which is capable of being recognized by the wearable electronic device, and/or (2) gaze of the user is directed toward a palm of the user, control the display to display the at least one first object at the position corresponding to the at least one finger.

4. The wearable electronic device of claim 3, wherein the memory further stores instructions, being executable by the processor, which cause the wearable electronic device to, while the at least one first object is displayed in a first area based on an arrangement of a-specific content of the first application, when (1) the palm in an open state faces the wearable electronic device within the space, and/or (2) the gaze of the user is directed toward the palm, change a display position of the at least one first object from the first area to a second area which is the position corresponding to the at least one finger.

5. The wearable electronic device of claim 1, wherein the memory further stores instructions, being executable by the processor, which cause the wearable electronic device to, based on identifying that the prespecified finger performs a prespecified gesture by using the camera while the first application is executed, control the display to display at least one additional object corresponding to at least one additional function of the first application at the position corresponding to the at least one finger.

6. The wearable electronic device of claim 1, wherein the memory further stores instructions, being executable by the processor, which cause the wearable electronic device to adjust an execution time of the first specific function corresponding to the specific finger in proportion to a contact time between the prespecified finger and the specific finger while the first application is executed.

7. The wearable electronic device of claim 1, wherein the memory further stores instructions, being executable by the processor, which cause the wearable electronic device to, when (1) the prespecified finger is in contact with the specific finger during the execution of the first application, and (2) a duration of the contact is less than or equal to a threshold time, execute a high priority function of the first application corresponding to the specific finger.

8. The wearable electronic device of claim 1, wherein the memory further stores instructions, being executable by the processor, which cause the wearable electronic device to, when (1) the prespecified finger is in contact with the specific finger during the execution of the first application, and (2) a duration of the contact exceeds a threshold time, execute a low priority function of the first application corresponding to the specific finger.

9. The wearable electronic device of claim 1, wherein the memory further stores instructions, being executable by the processor, which cause the wearable electronic device to, based on identifying that a direction of a palm of the user facing a first direction is switched to a second direction opposite to the first direction by using the camera, execute a historical back function with respect to a currently displayed screen of the first application.

10. An operation method of a wearable electronic device, the operation method comprising:

based on execution of a first application, controlling a display of the wearable electronic device to display at least one first object corresponding to at least one first function of the first application at a position corresponding to at least one finger of a user wearing the wearable electronic device;

based on identifying that a prespecified finger is in contact with a specific finger among the at least one finger by using a camera of the wearable electronic device while the first application is executed, executing a first specific function corresponding to the specific finger among the at least one first function;

based on execution of a second application, controlling the display to display at least one second object corresponding to at least one second function of the second application at the position corresponding to the at least one finger;

based on identifying that the prespecified finger is in contact with the specific finger by using the camera while the second application is executed, executing a second specific function corresponding to the specific finger among the at least one second function;

based on identifying that a gaze of the user stares at a first object corresponding to a first function of the first application for a prespecified time, controlling the display to display a second object inquiring whether to cause the first object to correspond to a first finger; and based on identifying that the user selects the second object, controlling the display to cause a third object configured to execute the first function to correspond to the first finger and to display the third object at a position corresponding to the first finger.

11. The operation method of claim 10, wherein the controlling of the display to display the at least one first object comprises:
    identifying the at least one first function corresponding to the at least one finger, based on the execution of the first application.

12. The operation method of claim 10, wherein the controlling of the display to display the at least one first object comprises:
    when (1) a shape of a hand of the user satisfies a specified condition within a space which is capable being recognized by the wearable electronic device, and/or (2) gaze of the user is directed toward a palm of the user, controlling the display to display the at least one first object at the position corresponding to the at least one finger.

13. The operation method of claim 12, wherein the controlling of the display to display the at least one first object comprises:
    while the at least one first object is displayed in a first area based on an arrangement of specific content of the first application, when (1) the palm in an open state faces the wearable electronic device within the space, and/or (2) the gaze of the user is directed toward the palm, changing a display position of the at least one first object from the first area to a second area which is the position corresponding to the at least one finger.

14. The operation method of claim 10, further comprising:
    based on identifying that the prespecified finger performs a prespecified gesture by using the camera while the first application is executed, controlling the display to display at least one additional object corresponding to at least one additional function of the first application at the position corresponding to the at least one finger.

15. The operation method of claim 10, wherein the executing of the first specific function comprises:
    adjusting an execution time of the first specific function corresponding to the specific finger in proportion to a contact time between the prespecified finger and the specific finger while the first application is executed.

16. The operation method of claim 10, wherein the executing of the first specific function comprises:
    when (1) the prespecified finger is in contact with the specific finger during the execution of the first application, and (2) a duration of the contact is less than or equal to a threshold time, executing a high priority function of the first application corresponding to the specific finger.

17. The operation method of claim 10, wherein the executing of the first specific function comprises:
    when (1) the prespecified finger is in contact with the specific finger during the execution of the first application, and (2) a duration of the contact exceeds a threshold time, executing a low priority function of the first application corresponding to the specific finger.

18. The operation method of claim 10, further comprising:
    based on identifying that a direction of a palm of the user facing a first direction is switched to a second direction opposite to the first direction by using the camera, executing a historical back function with respect to a currently displayed screen of the first application.

19. A non-transitory computer-readable storage medium storing instructions, being executable by a processor of a wearable electronic device, which cause the wearable electronic device to:
    based on execution of a first application, control a display to display at least one first object corresponding to at least one first function of the first application at a position corresponding to at least one finger of a user wearing the wearable electronic device;
    based on identifying that a prespecified finger is in contact with a specific finger among the at least one finger by using a camera while the first application is executed, execute a first specific function corresponding to the specific finger among the at least one first function;
    based on execution of a second application, control the display to display at least one second object corresponding to at least one second function of the second application at the position corresponding to the at least one finger;
    based on identifying that the prespecified finger is in contact with the specific finger by using the camera while the second application is executed, execute a second specific function corresponding to the specific finger among the at least one second function;
    based on identifying that a gaze of the user stares at a first object corresponding to a first function of the first application for a prespecified time, control the display to display a second object inquiring whether to cause the first object to correspond to a first finger; and
    based on identifying that the user selects the second object, control the display to cause a third object configured to execute the first function to correspond to the first finger and to display the third object at a position corresponding to the first finger.

* * * * *